US012250079B2

(12) United States Patent
Lee et al.

(10) Patent No.: US 12,250,079 B2
(45) Date of Patent: Mar. 11, 2025

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 17/658,148

(22) Filed: Apr. 6, 2022

(65) Prior Publication Data
US 2022/0329360 A1    Oct. 13, 2022

(30) Foreign Application Priority Data

Apr. 6, 2021   (KR) .................. 10-2021-0044514

(51) Int. Cl.
*H04L 1/18* (2023.01)
*H04L 1/1812* (2023.01)
*H04L 12/18* (2006.01)
*H04W 72/04* (2023.01)
*H04W 72/12* (2023.01)
*H04W 72/1273* (2023.01)
*H04W 72/20* (2023.01)
*H04W 72/0446* (2023.01)

(52) U.S. Cl.
CPC .......... *H04L 1/1812* (2013.01); *H04L 12/189* (2013.01); *H04W 72/1273* (2013.01); *H04W 72/20* (2023.01); *H04W 72/0446* (2013.01)

(58) Field of Classification Search
None
See application file for complete search history.

(56) References Cited

U.S. PATENT DOCUMENTS

| | | | |
|---|---|---|---|
| 2021/0029708 A1* | 1/2021 | Khoshnevisan | H04L 5/0023 |
| 2022/0287048 A1* | 9/2022 | Lin | H04L 27/2655 |
| 2022/0322292 A1* | 10/2022 | Takeda | H04W 72/30 |
| 2023/0133369 A1* | 5/2023 | Matsumura | H04L 5/0053 370/329 |
| 2023/0337238 A1* | 10/2023 | Takahashi | H04W 72/21 |

(Continued)

FOREIGN PATENT DOCUMENTS

WO    2020-165702    8/2020

OTHER PUBLICATIONS

PCT International Application No. PCT/KR2022/004953, International Search Report dated Jul. 26, 2022, 10 pages.

(Continued)

*Primary Examiner* — Scott M Sciacca
(74) *Attorney, Agent, or Firm* — LEE, HONG, DEGERMAN, KANG & WAIMEY

(57) ABSTRACT

Various embodiments of the present disclosure relate to a next-generation wireless communication system for supporting high data transfer rates beyond the 4th generation (4G) wireless communication system. According to the various embodiments, a method of transmitting and receiving signals in a wireless communication system and apparatus for supporting the same may be provided.

13 Claims, 24 Drawing Sheets

(56) References Cited

U.S. PATENT DOCUMENTS

2023/0413260 A1* 12/2023 Lei .................. H04W 72/12
2024/0187142 A1* 6/2024 Lei .................. H04L 1/1854

OTHER PUBLICATIONS

Nokia et al., "Group Scheduling Mechanisms to Support 5G Multicast / Broadcast Services for RRC_CONNECTED UEs," R1-2100510, 3GPP TSG RAN WG1 Meeting #104-e, e-Meeting, Feb. 2021, 17 pages.

Ericsson, "HARQ-ACK Enhancements for IIoT/URLLC," R1-2007707, 3GPP TSG-RAN WG1 Meeting #103-e, Online, Nov. 2020, 14 pages.

Huawei et al., "UE feedback enhancements for HARQ-ACK," R1-2007565, 3GPP TSG RAN WG1 Meeting #103-e, E-meeting, Nov. 2020, 10 pages.

TCL Communication, "UE feedback enhancements for HARQ-ACK," R1-2007789, 3GPP TSG RAN WG1 Meeting #103-e, e-Meeting, Nov. 2020, 8 pages.

* cited by examiner

FIG. 9

FIG. 13
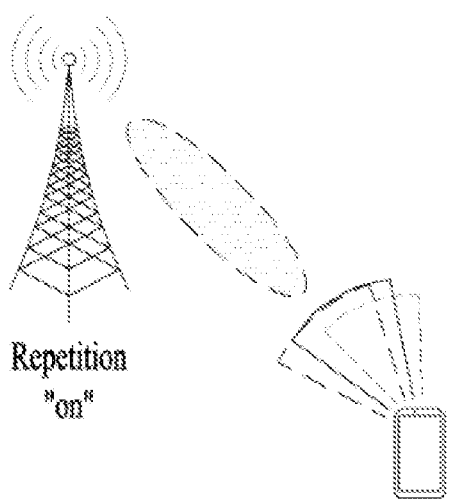
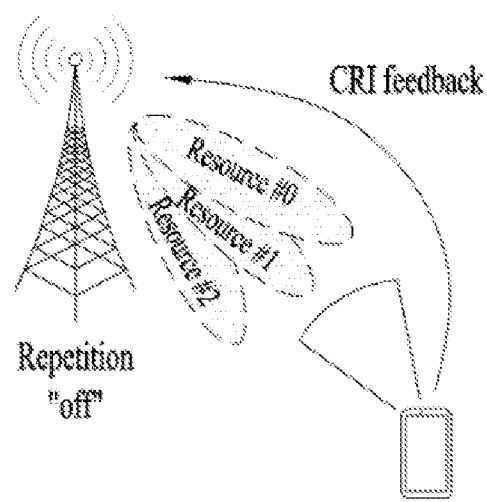

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

Pursuant to 35 U.S.C. § 119 (a), this application claims the benefit of an earlier filing date and right of priority to Korean Patent Application No. 10-2021-0044514 filed on Apr. 6, 2021, the contents of which is hereby incorporated by reference herein in its entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

According to an embodiment of the present disclosure, a method of transmitting and receiving signals by a user equipment (UE) in a wireless communication system is provided. The method may include: receiving information on a physical uplink control channel (PUCCH) configuration for the UE; receiving a downlink control information (DCI) scheduling a physical downlink shared channel (PDSCH) for multicast; receiving the PDSCH for multicast based on the DCI; and transmitting a PUCCH including information on a hybrid automatic repeat request (HARQ) feedback related to the PDSCH for multicast based on the DCI.

The DCI includes a first field related with PUCCH resource indicator (PRI) and a second field related to a PDSCH-to-HARQ feedback timing indicator.

The PDSCH-to-HARQ feedback timing indicator is determined based on the PUCCH configuration for the UE.

The method may further include determining a PUCCH resource for transmission of the PUCCH in a slot based on the PRI.

The slot is determined based on the PDSCH-to-HARQ feedback timing indicator.

The DCI is commonly used for a group comprising a plurality UEs including the UE, and A CRC of the DCI is scrambled with a RNTI for the group.

The PUCCH resource is separately configured for each UE in the group sharing the PRI and the PDSCH-to-HARQ feedback timing indicator.

The PRI of the DCI indicates enabling or disabling of the HARQ feedback.

Based on transmission timing of the HARQ feedback overlaps with another uplink transmission or downlink reception, the HARQ feedback is dropped based on a priority of the HARQ feedback is lower than another uplink transmission or downlink reception.

The PCI of the DCI is mapped to one or a plurality of transmission configuration indicator (TCI) states for the PUCCH.

A nonvolatile computer-readable medium having recorded thereon a program code for executing the method may be provided.

According an embodiment of the present disclosure, a UE operating in a wireless communication system is provided. The UE may include: a transceiver; and one or more processors connected to the transceiver.

The transceiver may be configured to: receive information on a physical uplink control channel (PUCCH) configuration for the UE; receive a downlink control information (DCI) scheduling a physical downlink shared channel (PDSCH) for multicast; receive the PDSCH for multicast based on the DCI.

According to other aspect of the present disclosure, a method of transmitting and receiving signals by a base station in a wireless communication system is presented. The method may include: transmitting information on a physical uplink control channel (PUCCH) configuration for a specific UE; transmitting a downlink control information (DCI) scheduling a physical downlink shared channel (PDSCH) for multicast; transmitting the PDSCH for multicast based on the DCI; and receiving a PUCCH including information on a hybrid automatic repeat request (HARQ) feedback related to the PDSCH for multicast based on the DCI.

According to other aspect of the present disclosure, a base station configured to operate in a wireless communication system is presented. The base station may include at least one transceiver; and at least one processor connected to the at least one transceiver.

The at least one processor is configured to control the at least one transceiver to: transmit information on a physical uplink control channel (PUCCH) configuration for a specific UE; transmit a downlink control information (DCI) scheduling a physical downlink shared channel (PDSCH) for multicast; transmit the PDSCH for multicast based on the DCI; and receive a PUCCH including information on a hybrid automatic repeat request (HARQ) feedback related to the PDSCH for multicast based on the DCI.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

BRIEF DESCRIPTION OF THE DRAWINGS

FIG. 9 illustrates an example of a RACH occasion defined in one RACH slot in the NR system;

FIG. 13 illustrates an example of a DL beam management procedure using CSI-RS;

DETAILED DESCRIPTION

Figure 1:
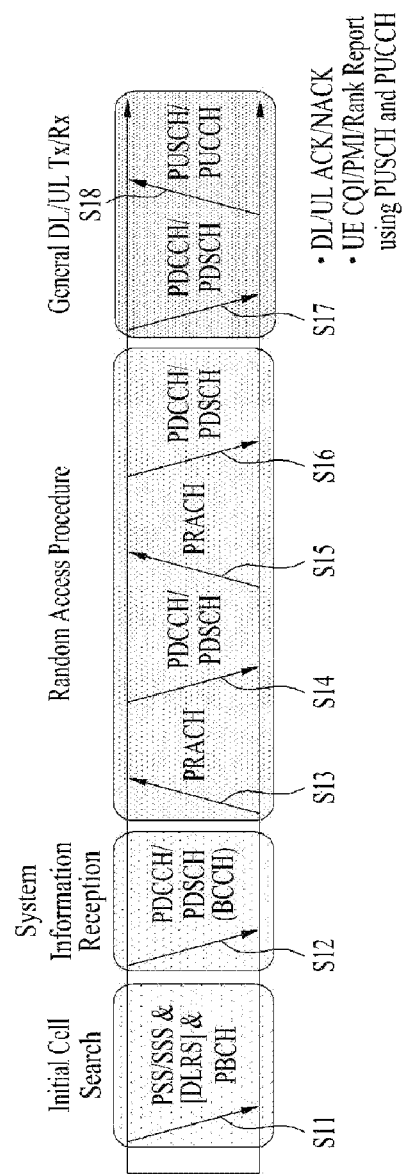
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFL Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
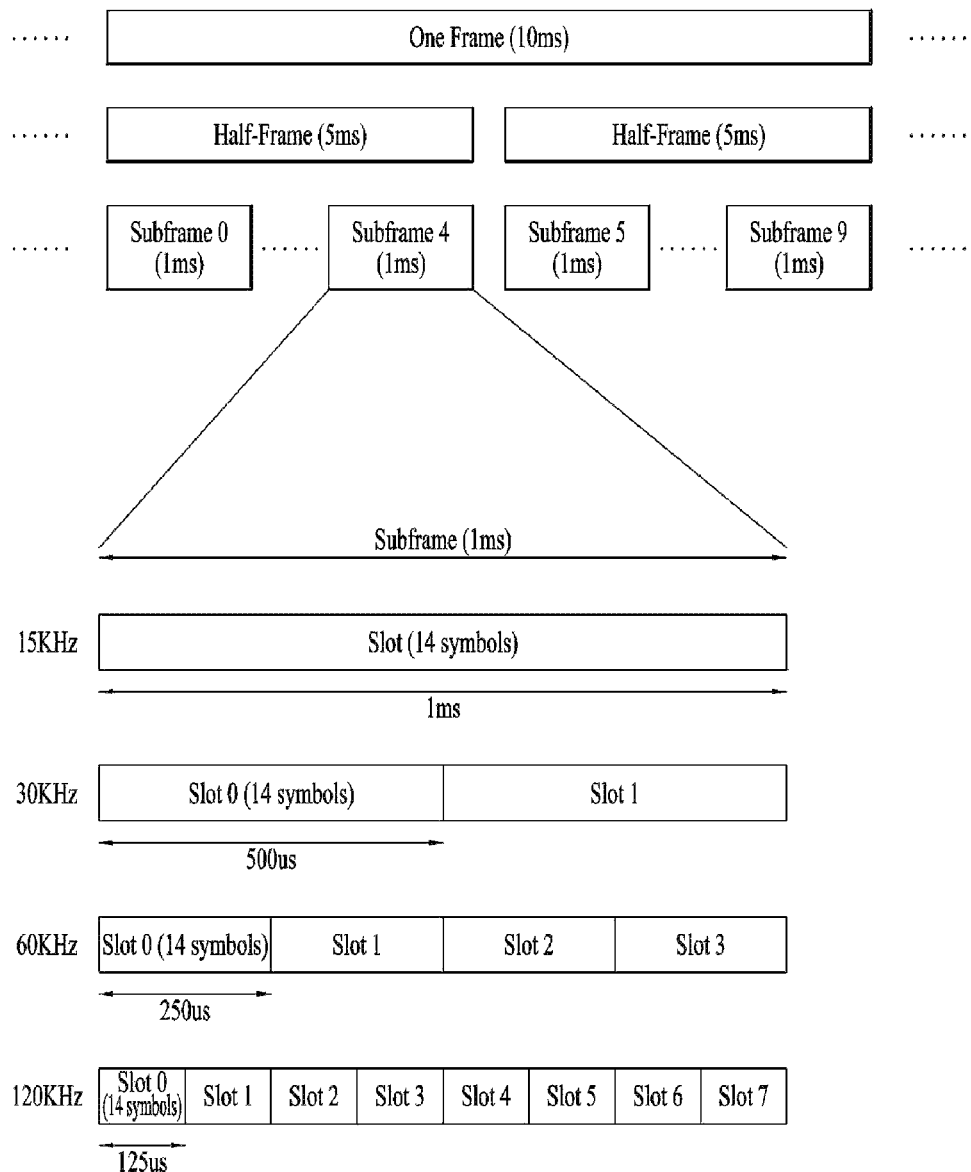
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
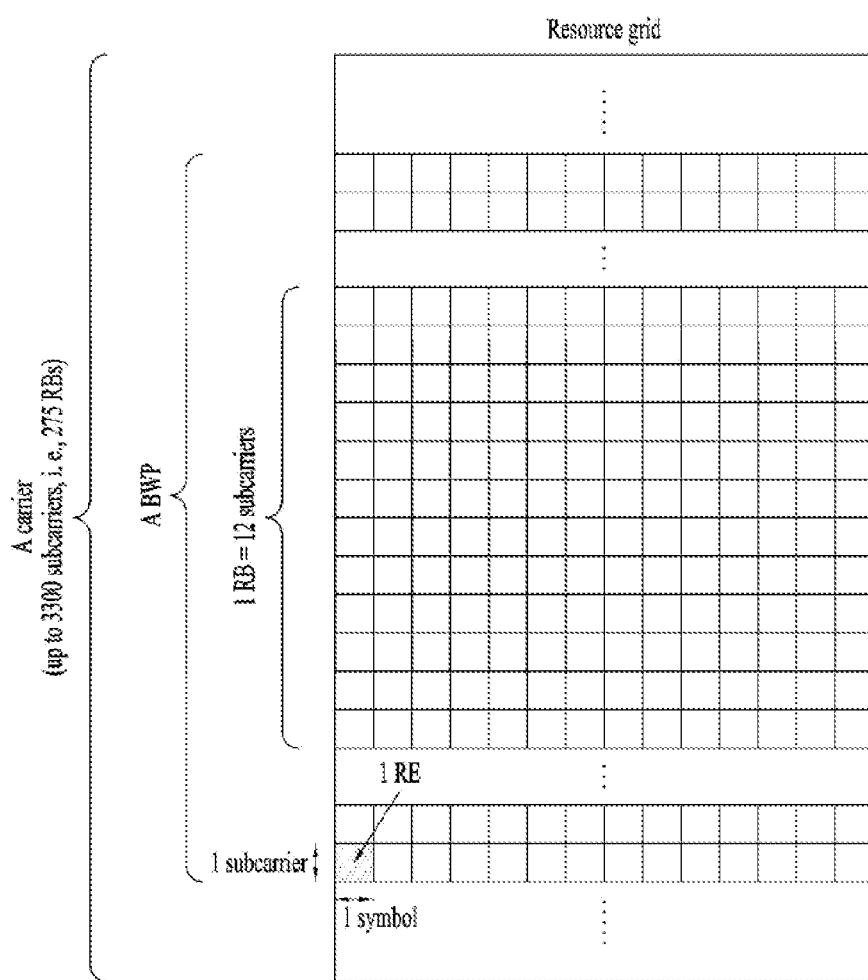
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
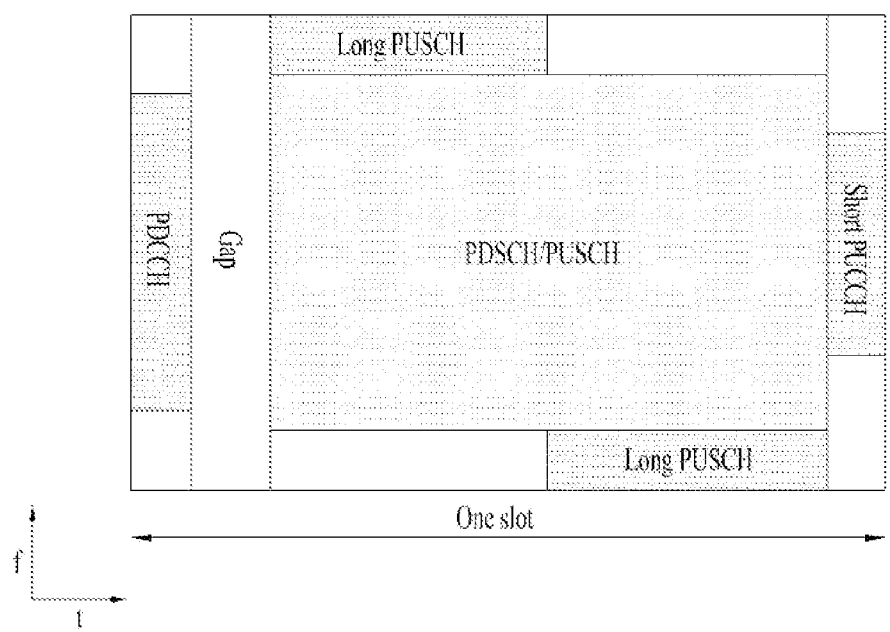
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
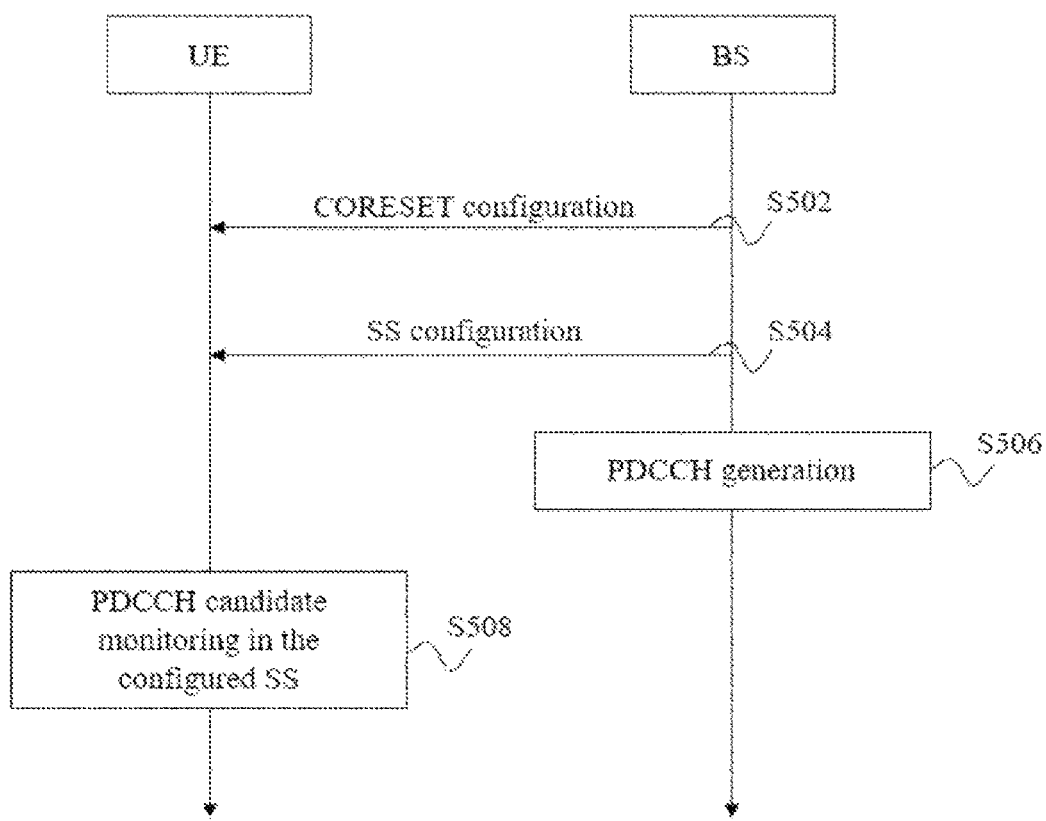
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.
pdcch-DMRS-ScramblingID: indicates a value used for PDCCH DMRS initialization. When pdcch-DMRS-ScramblingID is not included, the physical cell ID of a serving cell is used.
precoderGranularity: indicates a precoder granularity in the frequency domain.
reg-BundleSize: indicates an REG bundle size.
tci-PresentInDCI: indicates whether a transmission configuration index (TCI) field is included in DL-related DCI.
tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
    controlResourceSetId: indicates a CORESET associated with the SS.
    monitoringSlotPeriodicityAndOffset: indicates a periodicity (in slots) and offset (in slots) for PDCCH monitoring.
    monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
    nrofCandidates: indicates the number of PDCCH candidates (one of values 0, 1, 2, 3, 4, 5, 6, and 8) for each AL where AL={ 1, 2, 4, 8, 16}.
    searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot. Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_ CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB 1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHz). The UE determines that a control resource set for Type0-PDCCH common search space is not present if $k_{SSB} > 23$ for FR1 and if $k_{SSB} > 11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.

SIB1 includes information related to the availability and scheduling (e.g., a transmission periodicity and an SI-window size) of the other SIB s (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
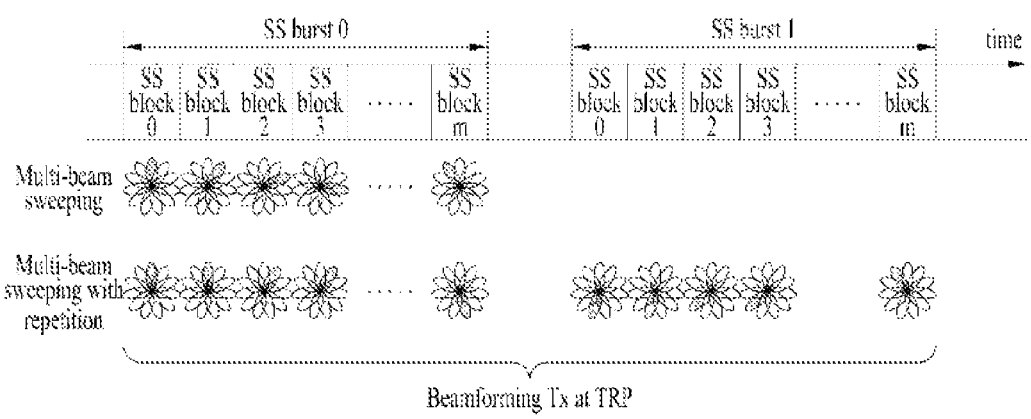
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

*Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
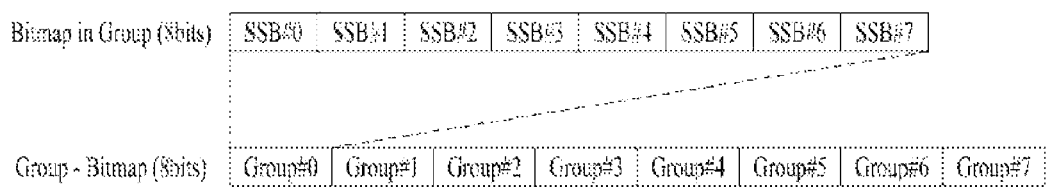
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bit-map for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
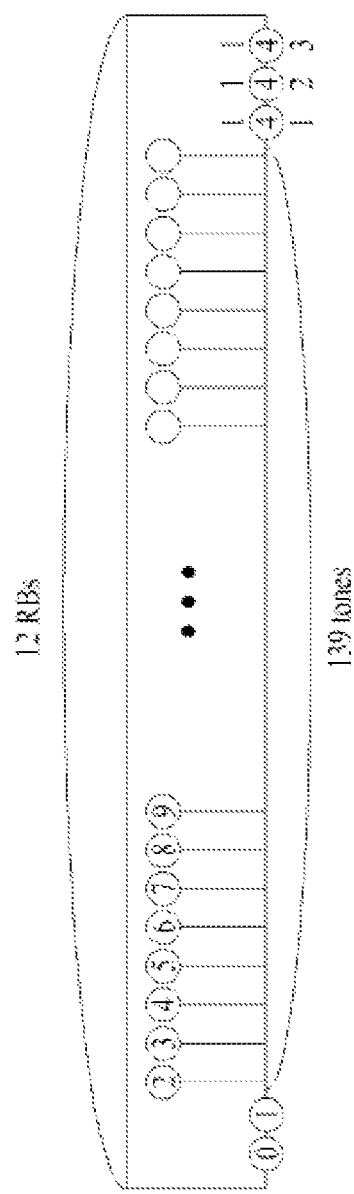
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, $\mu$ is 0. In the case of 30 kHz subcarrier spacing, μ is 1. Table 5 shows Preamble formats for $L_{RA}=139$ and $\Delta f^{RA}=15\times 2^\mu$ kHz, where $\mu\in\{0,1,2,3\}$, $\kappa=T_s/T_c=64$.

TABLE 5

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C2 | 139 | $15 \times 2^\mu$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B 1, B2, B3.

TABLE 6

| PRACH Configuration Index | Preamble format | $n_{SFN}$mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 4, 9 | 0 | 1 | 6 | 2 |
| 82 | A1 | 1 | 0 | 7, 9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4, 9 | 0 | 1 | 2 | 6 |
| 128 | A3 | 1 | 0 | 7, 9 | 7 | 1 | 1 | 6 |
| 142 | B1 | 1 | 0 | 4, 9 | 2 | 1 | 6 | 2 |
| 143 | B1 | 1 | 0 | 7, 9 | 8 | 1 | 3 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 251 | A3/B3 | 1 | 0 | 4, 9 | 0 | 1 | 2 | 6 |
| 252 | A3/B3 | 1 | 0 | 7, 9 | 2 | 1 | 2 | 6 |

Figure 9:
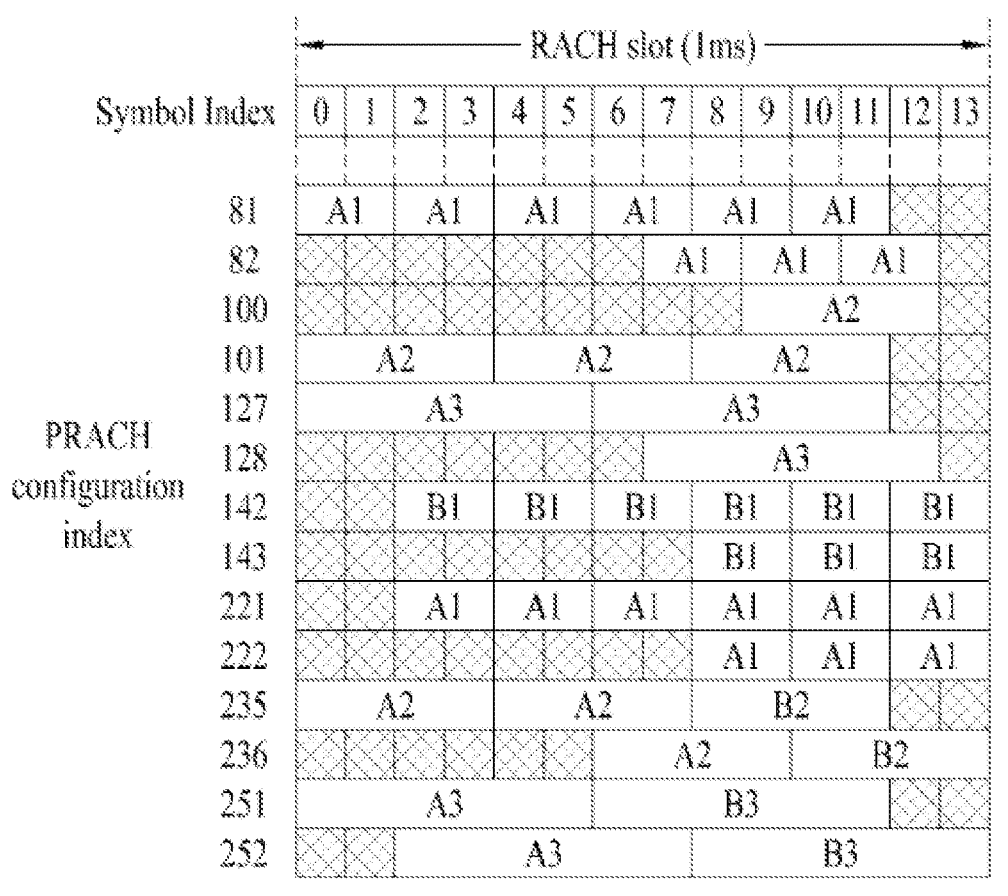

Referring to Table 6, information about the number of ROs defined in a RACH slot for each preamble format (i.e., $N_t^{RA, slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

Beam Management

Beam management (BM) procedures defined in new radio (NR) will now be described. The BM procedures as a layer 1 (L1)/layer 2 (L2) procedures for acquiring and maintaining a set of beams of a BS (e.g., a gNB, a TRP, etc.) and/or terminal (e.g., UE), that may be used for DL and UL transmission/reception, may include the following procedures and terms.

Beam measurement: Operation of measuring characteristics of a received beamforming signal by a gNB or a UE.

Beam determination: Operation of selecting a transmit (Tx) beam/receive (Rx) beam of the gNB and the UE by the gNB and the UE.

Beam sweeping: Operation of covering a spatial region using a Tx and/or Rx beam for a predetermined time interval in a predetermined manner.

Beam report: Operation of reporting information of a beamformed signal based on beam measurement.

For beam measurement, a synchronization signal (SS) block (or SS/physical broadcast channel (PBCH) block) (SSB) or a channel state information reference signal (CSI-RS) is used on DL, and a sounding reference signal (SRS) is used on UL. In RRC_CONNECTED, the UE may measure a plurality of beams (or at least one beam) of a cell and average measurement results (reference signal received power (RSRP), reference signal received quality (RSRQ), signal-to-interference-plus-noise ratio (SINR), etc.) to derive cell quality. Therethrough, the UE may be configured to consider a subset of detected beam(s).

Beam measurement-related filtering occurs at two different levels (a physical layer deriving beam quality and an RRC level deriving cell quality in multiple beams). Cell quality from beam measurement is derived in the same manner for serving cell(s) and non-serving cell(s).

Figure 10:
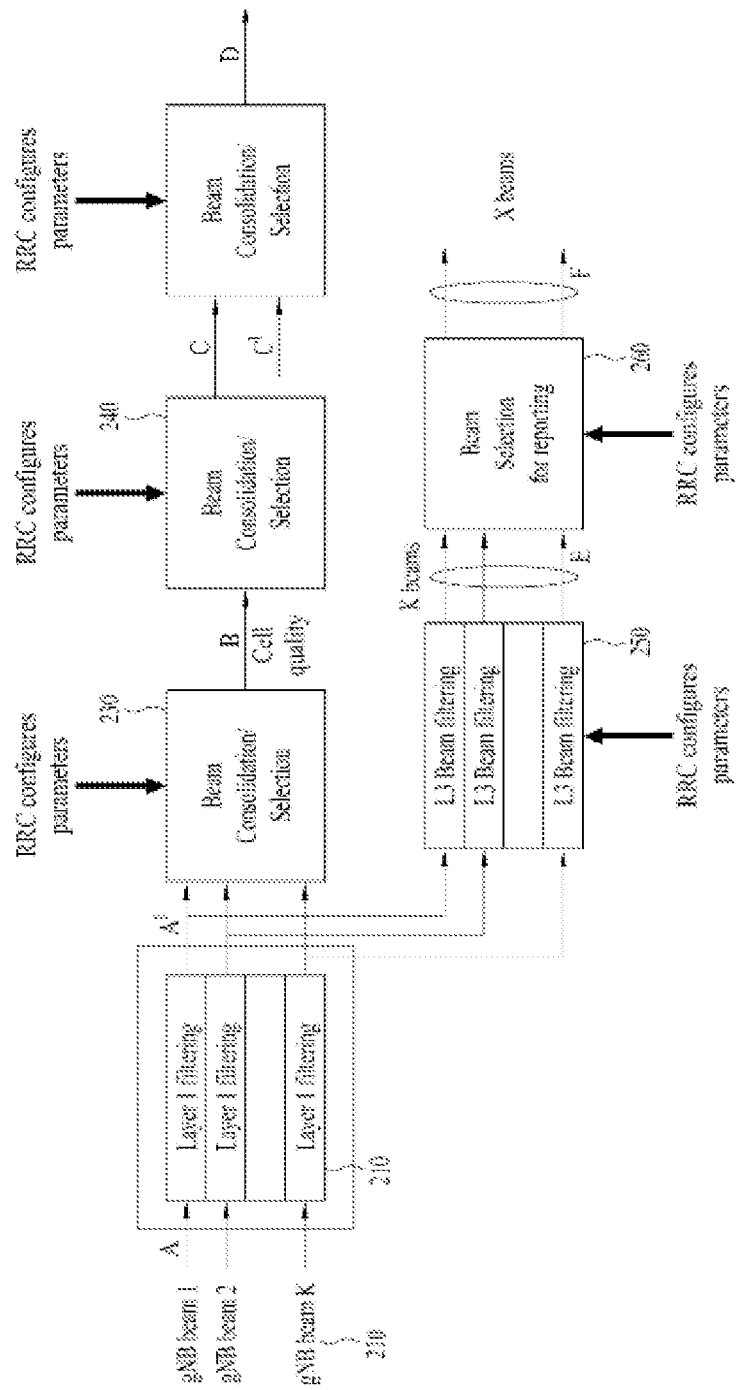
FIG. 10 illustrates an example of a beam related measurement model.

If the UE is configured to report measurement results for specific beam(s) by the gNB, a measurement report includes measurement results for X best beams. The beam measurement results may be reported as L1-RSRP. In FIG. 10, K beams (gNB beam 1, gNB beam 2, . . . , gNB beam k) 210 are configured for L3 mobility by the gNB and correspond to measurement of an SSB or a CSI-RS resource detected by the UE in L1. In FIG. 10, layer 1 filtering 220 refers to filtering of internal layer 1 of input measured at a point A. Beam consolidation/selection 230 is consolidated (or integrated) such that beam specific measurement derives cell quality. Layer 3 filtering 240 for cell quality refers to filtering performed for measurement provided at a point B. The UE evaluates reporting criteria whenever a new measurement result is reported at least at points C and C1. D corresponds to measurement report information (message) transmitted through a radio interface. L3 beam filtering 250 performs filtering for measurement provided at point A1 (beam specific measurement). Beam selection 260 for beam reporting selects X measurement values from measurement provided at a point E. F indicates beam measurement information included in a measurement report (transmitted) through the radio interface.

The BM procedures may be divided into (1) a DL BM procedure using an SS/PBCH block or a CSI-RS and (2) a UL BM procedure using an SRS. Further, each BM procedure may include Tx beam sweeping for determining a Tx beam and Rx beam sweeping for determining an Rx beam.

DL BM Procedure

The DL BM procedure will now be described first. The DL BM procedure may include (1) transmission of beamformed DL RSs (e.g., a CSI-RS or an SS block (SSB)) of the gNB and (2) beam reporting of the UE. Here, beam reporting may include preferred DL RS identifier(s) (ID(s)) and L1-RSRP corresponding thereto. The DL RS ID may be an SSB resource indicator (SSBRI) or a CSI-RS resource indicator (CRI).

Figure 11:
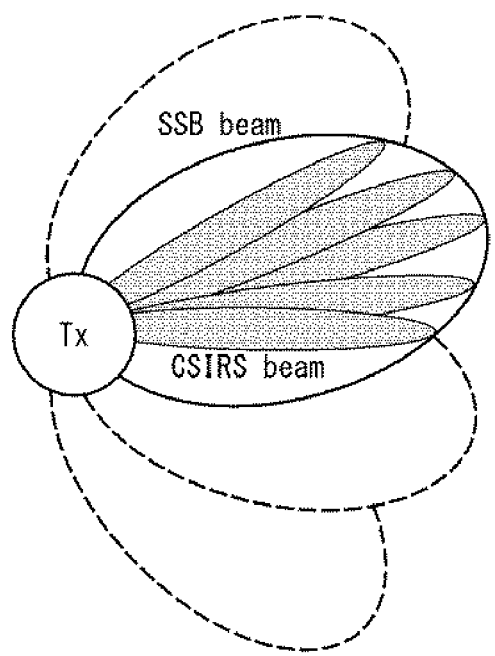
FIG. 11 illustrates an example of a Tx beam related to a DL beam management procedure.

FIG. 11 illustrates an example of a Tx beam related to the DL BM procedure.

As illustrated in FIG. 11, an SSB beam and a CSI-RS beam may be used for beam measurement. Here, a measurement metric is L1-RSRP per resource/block. An SSB may be used for coarse beam measurement, and a CSI-RS may be used for fine beam measurement. The SSB may be used for both Tx beam sweeping and Rx beam sweeping. Rx beam sweeping using the SSB may be performed while the UE changes an Rx beam for the same SSBRI across a plurality of SSB bursts. In this case, one SS burst includes one or more SSBs, and one SS burst set includes one or more SSB bursts.

DL BM Procedure Using SSB

Figure 12:
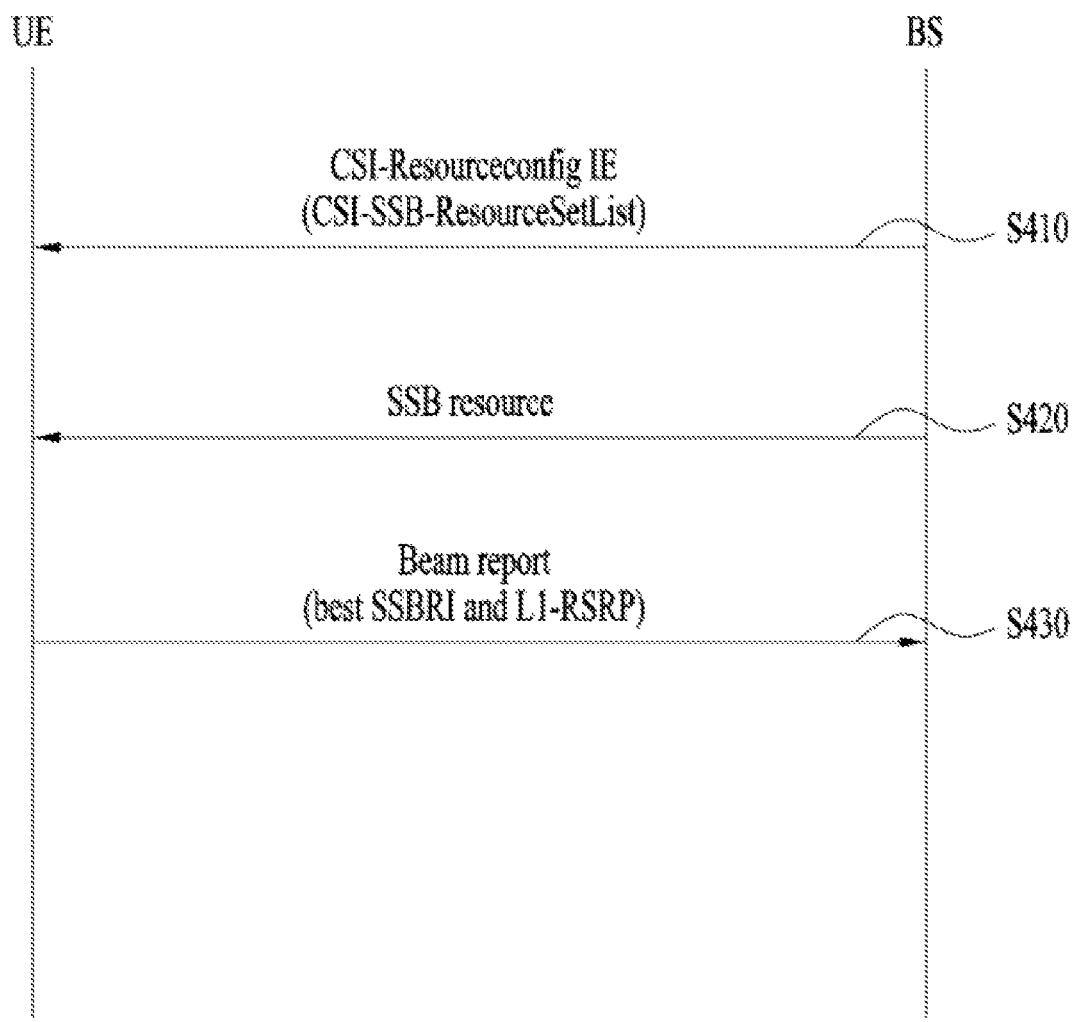
FIG. 12 is a flowchart illustrating an example of a DL beam management procedure using SSB.

FIG. 12 is a flowchart illustrating an example of a DM BM procedure using an SSB.

A configuration for beam reporting using the SSB is performed in an RRC connected state (or an RRC connected mode) during CSI/beam configuration. As in a CSI-ResourceConfig IE of Table 7 below, a BM configuration using the SSB is not separately defined, and the SSB is configured like a CSI-RS resource. Table 7 shows an example of the CSI-ResourceConfig IE.

TABLE 7

```
-- ASN1START
-- TAG-CSI-RESOURCECONFIG-START
CSI-ResourceConfig ::=                    SEQUENCE {
   csi-ResourceConfigId                      CSI-ResourceConfigId,
   csi-ResourceSetList                       CHOICE {
      nzp-CSI-RS-SSB                            SEQUENCE {
         nzp-CSI-RS-ResourceSetList                SEQUENCE (SIZE (1..maxNrofNZP-CSI-RS-ResourceSetsPerConfig)) OF NZP-CSI-RS-ResourceSetId    OPTIONAL,
         csi-SSB-ResourceSetList                   SEQUENCE (SIZE (1..maxNrofCSI-SSB-ResourceSetsPerConfig)) OF CSI-SSB-ResourceSetId      OPTIONAL
      },
      csi-IM-ResourceSetList                    SEQUENCE (SIZE (1..maxNrofCSI-IM-ResourceSetsPerConfig)) OF CSI-IM-ResourceSetID
   },
   bwp-Id                                    BWP-Id,
   resourceceType                            ENUMERATED { aperiodic, semiPersistent, periodic },
   ...
}
-- TAG-CSI-RESOURCECONFIGTOADDMOD-STOP
-- ASN1STOP
```

In Table 7, a csi-SSB-ResourceSetList parameter indicates a list of SSB resources used for BM and reporting in one resource set. The UE receives a CSI-ResourceConfig IE which includes CSI-SSB-ResourceSetList including SSB resources used for BM from the gNB (S410).

Here, an SSB resource set may be configured as {SSBx1, SSBx2, SSBx3, SSBx4, . . . }. SSB indexes may be defined from 0 to 63. The UE receives the SSB resources from the gNB based on CSI-SSB-ResourceSetList (S420). When CSI-RS reportConfig related to reporting for an SSBRI and an L1-RSRP is configured, the UE (beam-)reports the best SSBRI and an L1-RSRP corresponding thereto to the gNB (S430). That is, when reportQuantity of the CSI-RS reportConfig IE is configured as ssb-Index-RSRP', the UE reports the best SSBRI and the L1-RSRP corresponding thereto to the gNB. When a CSI-RS resource is configured in the same OFDM symbol(s) as an SS/PBCH block (SSB) and 'QCL-TypeD' is applicable, the UE may assume that a CSI-RS and the SSB are quasi co-located (QCLed) in terms of 'QCL-TypeD'. Here, QCL-TypeD may mean that antenna ports are QCLed in terms of a spatial Rx parameter. When the UE receives a plurality of DL antenna ports which is in a QCL-Type D relationship, the same Rx beam may be applied. The UE does not expect that the CSI-RS will be configured on an RE overlapped with an RE of the SSB.

DL BM Procedure Using CSI-RS

When the UE is configured with NZP-CSI-RS-ResourceSet in which (higher layer parameter) repetition is set to 'ON', the UE may assume that at least one CSI-RS resource in NZP-CSI-RS-ResourceSet is transmitted through the same DL spatial domain transmission filter. That is, at least one CSI-RS resource in NZP-CSI-RS-ResourceSet is transmitted through the same Tx beam. Here, at least one CSI-RS resource in NZP-CSI-RS-ResourceSet may be transmitted in different OFDM symbols or in different frequency regions (i.e., in FDM). The case in which the at least one CSI-RS resource is subjected to FDM is the case of a multi-panel UE. When repetition is set to 'ON', this is related to an Rx beam sweeping procedure of the UE. The UE does not expect to receive different periodicities in periodicityAndOffset on all CSI-RS resources in NZP-CSI-RS-ResourceSet. If repetition is set to 'OFF', the UE does not assume that at least one CSI-RS resource in NZP-CSI-RS-ResourceSet is transmitted through the same DL spatial domain transmission filter. That is, at least one CSI-RS resource in NZP-CSI-RS-ResourceSet is transmitted through different Tx beams. When repetition is set to 'OFF', this is related to a Tx beam sweeping procedure of the gNB. The repetition parameter may be configured only for an L1 RSRP and CSI-RS resource sets associated with CSI-ReportConfig having a report of 'No Report (or None)'.

If the UE is configured with CSI-ReportConfig in which reportQuantity is set to 'cri-RSRP' or 'none', and CSI-ResourceConfig (higher layer parameter resourcesForChannelMeasurement) for channel measurement does not include a higher layer parameter 'trs-Info' and includes NZP-CSI-RS-ResourceSet configured as a higher layer parameter 'repetition' (repetition=ON), the UE may be configured only with the same number of ports (one port or two ports) having a higher layer parameter 'nrofPorts' for all CSI-RS resources in NZP-CSI-RS-ResourceSet. Specifically, use of a CSI-RS will now be described. If the repetition parameter is configured and TRS_info is not configured in a specific CSI-RS resource set, the CSI-RS is used for BM. If the repetition parameter is not configured and TRS_info is configured, the CSI-RS is used for a tracking reference signal (TRS). If the repetition parameter is not configured and TRS_info is not configured, the CSI-RS is used for CSI acquisition.

FIG. 13 illustrates an example of a DL BM procedure using a CSI-RS.

FIG. 13a illustrates an Rx beam determination (or refinement) procedure of a UE, and FIG. 13b illustrates a Tx beam determination procedure of a gNB. In addition, FIG. 13a shows the case in which a repetition parameter is set to 'ON', FIG. 13b shows the case in which the repetition parameter is set to 'OFF'.

Figure 14:
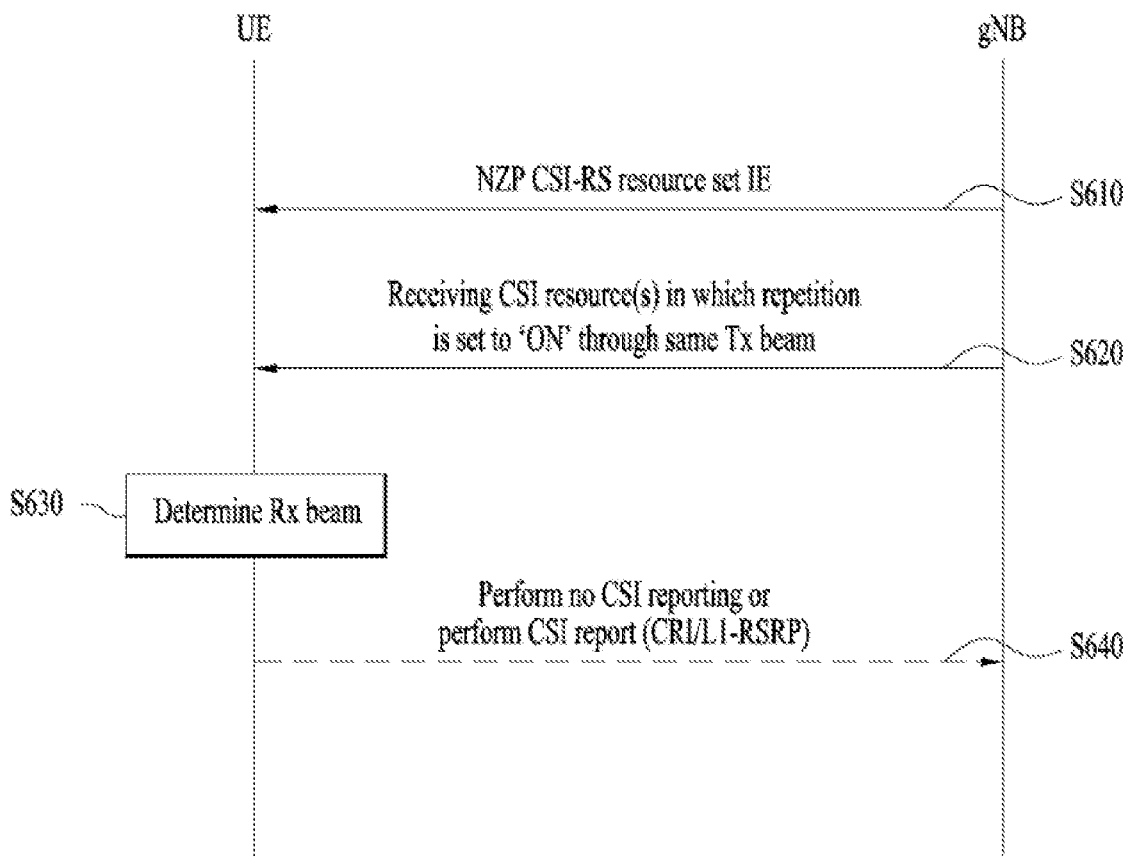
FIG. 14 is a flowchart illustrating an example of a Rx beam determination process of a terminal.

FIG. 14 is a flowchart illustrating an example of an Rx beam determination process of a UE.

The Rx beam determination process of the UE will be described with reference to FIG. 13a and FIG. 14.

The UE receives an NZP CSI-RS resource set IE including a higher layer parameter 'repetition' from the gNB through RRC signaling (S610). Here, the repetition parameter is set to 'ON'. The UE repeatedly receives resource(s) in a CSI-RS resource set in which the repetition parameter is set to 'ON' in different OFDM symbols through the same Tx beam (or DL spatial domain transmission filter) of the gNB (S620). Therethrough, the UE determines an Rx beam thereof (S630). Here, the UE performs no CSI report or transmits a CSI report including a CRI/L1-RSRP to the gNB (S640). In this case, reportQuantity of a CSI report configuration may be set to 'No report (or None)' or 'CRT+L1-RSRP'. That is, when repetition is set to 'ON', the UE may omit the CSI report or report ID information (CRI) about a preferred beam related to a beam pair and a quality value (L1-RSRP) corresponding thereto.

Figure 15:
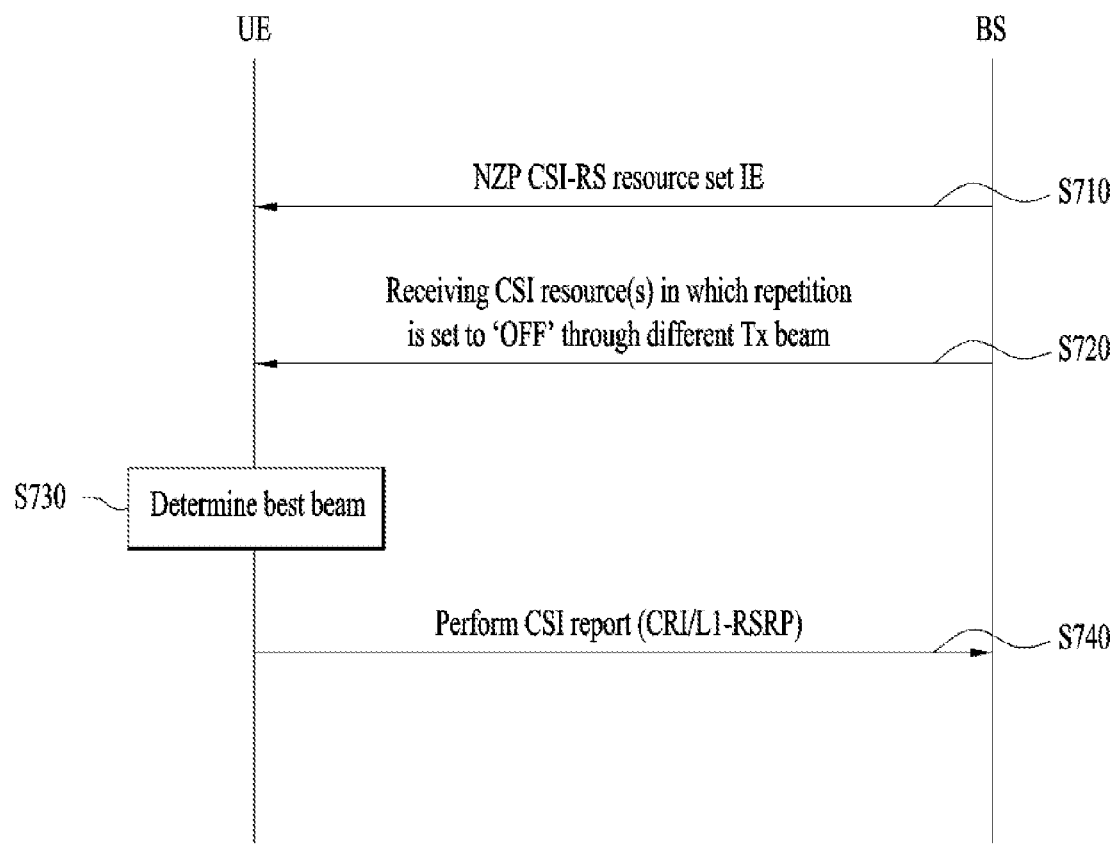
FIG. 15 is a flowchart illustrating an example of a transmission beam determination process of a base station.

FIG. 15 is a flowchart illustrating an example of a Tx beam determination process of a gNB.

The Tx beam determination process of the gNB will now be described with reference to FIGS. 13b and 15.

The UE receives an NZP CSI-RS resource set IE including a higher layer parameter 'repetition' from the gNB through RRC signaling (S710). Here, the repetition parameter is set to 'OFF' and is related to a Tx beam sweeping procedure of the gNB. The UE receives resources in a CSI-RS resource set in which the repetition parameter is set to 'OFF' through different Tx beams (DL spatial domain transmission filters) of the gNB (S720).

Then, the UE selects (or determines) the best beam (S740) and reports an ID of the selected beam and related quality information (e.g., L1-RSRP) to the gNB (S740). In this case, reportQuantity of a CSI report configuration may be set to 'CRT+L1-RSRP'. That is, when a CSI-RS is transmitted for BM, the UE reports a CRI and an L1-RSRP related thereto to the gNB.

Figure 16:
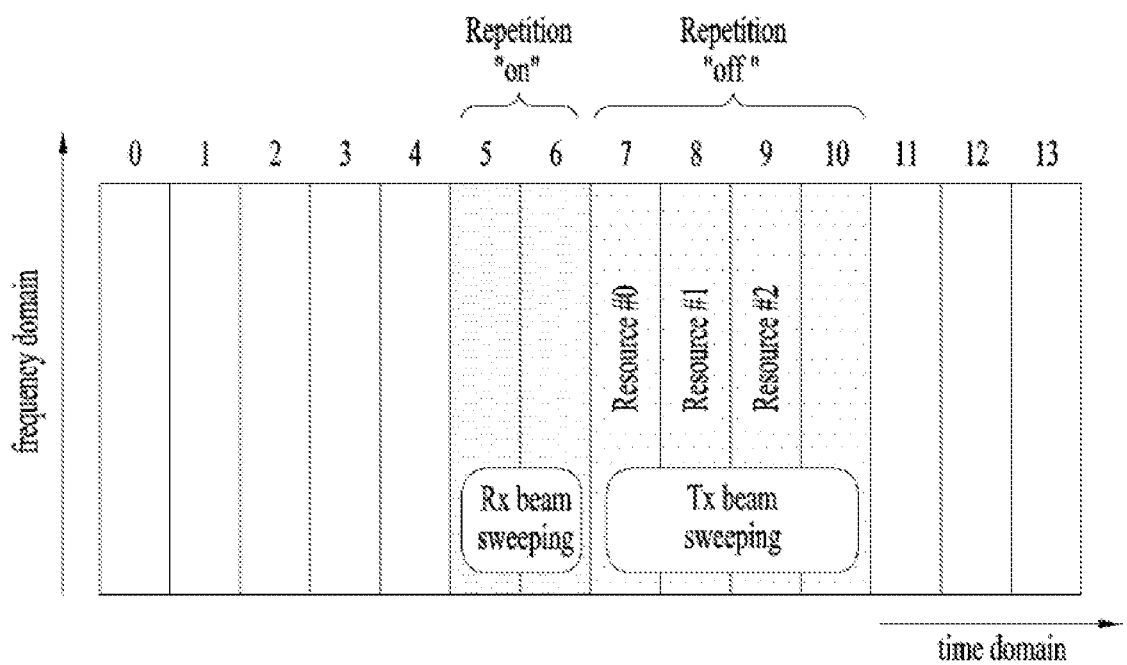
FIG. 16 illustrates an example of resource allocation in time and frequency domains related to the operation of FIG. 13.

FIG. 16 is a diagram illustrating an example of resource allocation in the time and frequency domains related to the operation of FIG. 13. That is, it may be seen that, when the repetition parameter in the CSI-RS resource set is set to 'ON', a plurality of CSI-RS resources is repeatedly used by applying the same Tx beam and, when the repetition parameter in the CSI-RS resource set is set to 'OFF', different CSI-RS resources are transmitted through different Tx beams.

Beam Indication Related to DL BM

The UE may receive RRC configuration of a list of at least M candidates for the purpose of a Quasi Co-location (QCL) indication, Transmission Configuration Indication (TCI) states. Here, M may be 64. Each TCI state may be configured as one RS set.

At least each ID of DL RS for spatial QCL purpose (QCL Type D) in the RS set may refer to one of DL RS types such as SSB, P-CSI RS, SP-CSI RS, and A-CSI RS. At least, initialization/update of ID(s) of DL RS(s) in the RS set used for spatial QCL purpose may be performed through at least explicit signaling.

Table 8 shows an example of TCI-State IE. The TCI-State IE associates one or two DL reference signals (RS) with corresponding quasi co-location (QCL) types.

TABLE 8

```
-- ASN1START
-- TAG-TCI-STATE-START
TCI-State ::=                    SEQUENCE {
   tci-StateId                       TCI-StateId,
   qcl-Type1                         QCL-Info,
   qcl-Type2                         QCL-Info
   OPTIONAL,   -- Need R
   ...
}
QCL-Info ::=                     SEQUENCE {
   cell                              ServCellIndex
   OPTIONAL,   -- Need R
```

TABLE 8-continued

| | |
|---|---|
| bwp-Id<br>OPTIONAL, -- Cond CSI-RS-Indicated | BWP-Id |
| referenceSignal<br>csi-rs<br>ResourceId, | CHOICE {<br>NZP-CSI-RS- |
| ssb<br>},<br>qcl-Type<br>typeB, typeC, typeD).<br>...<br>}<br>-- TAG-TCI-STATE-STOP<br>-- ASN1STOP | SSB-Index<br>ENUMERATED (typeA, |

In Table 8, the bwp-Id parameter indicates the DL BWP in which the RS is located, and the cell parameter indicates the carrier in which the RS is located. And the reference signal parameter represents a reference antenna port(s) that is a source of quasi co-location for the corresponding target antenna port(s) or a reference signal including it. The target antenna port(s) may be CSI-RS, PDCCH DMRS, or PDSCH DMRS. For example, in order to indicate QCL reference RS information for the NZP CSI-RS, the corresponding TCI state ID may be indicated in the NZP CSI-RS resource configuration information. As another example, in order to indicate QCL reference information for the PDCCH DMRS antenna port(s), the TCI state ID may be indicated in each CORESET configuration. As another example, the TCI state ID may be indicated through DCI to indicate QCL reference information for the PDSCH DMRS antenna port(s).

QCL(Quasi-Co Location)

An antenna port is defined such that a channel on which a symbol on an antenna port is carried can be inferred from a channel on which another symbol on the same antenna port is carried. When the property of a channel carrying a symbol on one antenna port can be inferred from a channel carrying a symbol on another antenna port, the two antenna ports are QC/QCL (quasi co-located or quasi co-location) can be said to be in a relationship.

The channel characteristic includes at least Delay spread, Doppler spread, Frequency shift, Average received power, Received Timing, and one or more of Spatial RX parameter. The Spatial Rx parameter means a spatial (receive) channel characteristic parameter such as angle of arrival.

In order for the UE to decode the PDSCH according to the detected PDCCH having the DCI intended for the UE and a given serving cell, a list of up to M TCI-State configurations in the higher layer parameter PDSCH-Config may be configured. The M depends on UE capability.

Each TCI-State includes parameters for establishing a quasi co-location relationship between one or two DL reference signals and a DM-RS port of the PDSCH. The quasi co-location relationship is set with the higher layer parameter qcl-Type1 for the first DL RS and qcl-Type2 (if set) for the second DL RS. In the case of two DL RSs, the QCL type is not the same regardless of whether the reference is the same DL RS or different DL RSs. The quasi co-location type corresponding to each DL RS is given by the higher layer parameter qcl-Type of QCL-Info, and can take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if the target antenna port is a specific NZP CSI-RS, the corresponding NZP CSI-RS antenna ports are indicated/configured to be QCL with a specific TRS from a QCL-Type A perspective and a specific SSB from a QCL-Type D perspective. there is. The UE receiving this instruction/configuration receives the corresponding NZP CSI-RS using the Doppler and delay values measured in QCL-TypeA TRS, and applies the reception beam used for QCL-TypeD SSB reception to the corresponding NZP CSI-RS reception. can do. The UE receives the activation command used to map up to 8 TCI states to the codepoint of the DCI field 'Transmission Configuration Indication'.

UL BM Procedure

In the UL BM, beam reciprocity (or beam correspondence) between Tx beams and Rx beams may or may not be established according to UE implementation. If the reciprocity between the Tx beam and the Rx beam is established in both the base station and the UE, the UL beam pair may be aligned through the DL beam pair. However, when the reciprocity between the Tx beam and the Rx beam is not established in either of the base station and the UE, a UL beam pair determination process is required separately from the DL beam pair determination. In addition, even when both the base station and the UE maintain beam correspondence, the base station can use the UL BM procedure for DL Tx beam determination without the UE requesting a report of a preferred beam. UL BM may be performed through beamformed UL SRS transmission, and the 'SRS-SetUse' parameter is set to 'BeamManagement'. Similarly, the UL BM procedure may be divided into Tx beam sweeping of the UE and Rx beam sweeping of the base station. The UE (higher layer parameter) may receive one or more Sounding Reference Symbol (SRS) resource sets configured by the SRS-ResourceSet (through higher layer signaling, RRC signaling, etc.). For each SRS resource set, the UE K≥1 SRS resources (higher later parameter SRS-resource) may be configured. Here, K is a natural number, and the maximum value of K is indicated by SRS_capability. Whether to apply the UL BM of the SRS resource set (higher layer parameter) is set by SRS-SetUse. When the SRS-SetUse is set to 'BeamManagement (BM)', only one SRS resource may be transmitted to each of a plurality of SRS resource sets at a given time instant.

Figure 17:
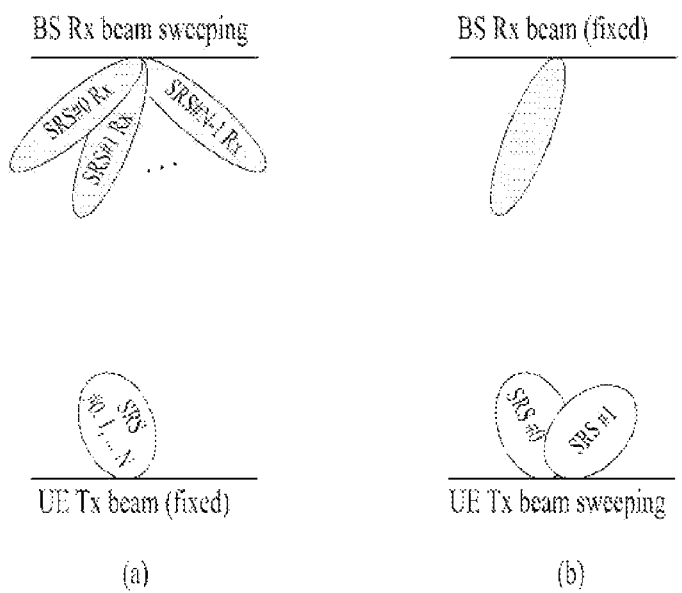
FIG. 17 illustrates an example of a method in which a base station and a UE perform group common SPS transmission and reception.

FIG. 17 illustrates an example of a UL BM procedure using SRS.

Specifically, FIG. 17(a) shows the Rx beam determination procedure of the base station, and FIG. 17(b) shows the Tx beam determination procedure of the UE.

Figure 18:
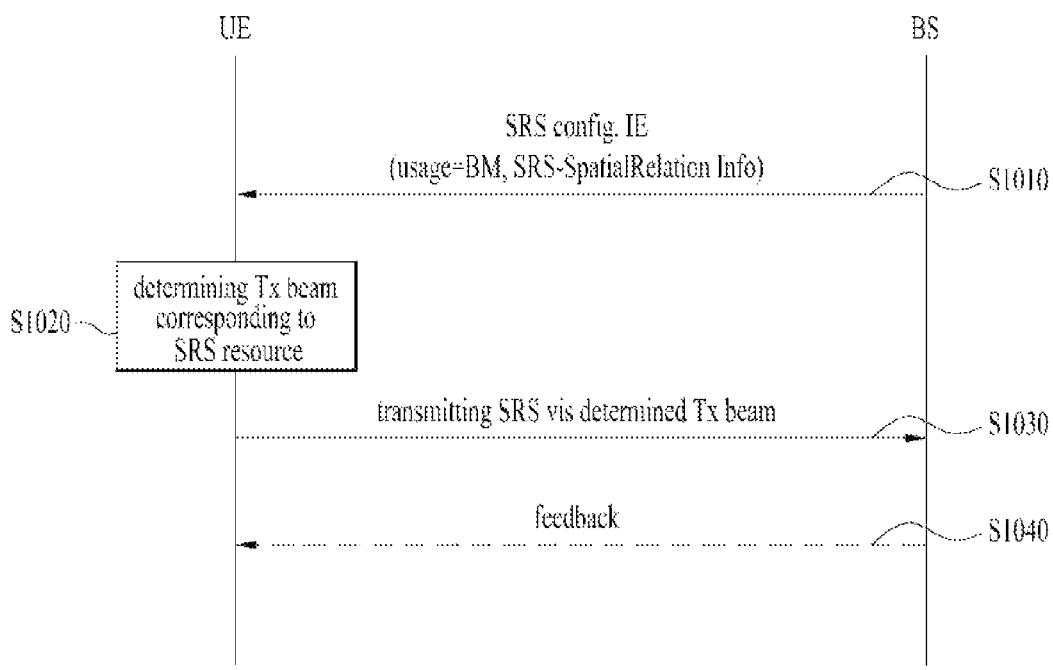
FIG. 18 illustrates an example of a UL BM (beam management) procedure using SRS.

FIG. 18 illustrates an example of a UL BM procedure using SRS.

The terminal receives RRC signaling (eg, SRS-Config IE) including a usage parameter set to 'beam management' (higher layer parameter) from the base station (S1010). Table 9 shows an example of an SRS-Config IE (Information Element), and the SRS-Config IE is used for SRS transmission configuration. The SRS-Config IE includes a list of SRS-Resources and a list of SRS-ResourceSets. Each SRS resource set means a set of SRS-resources. The network triggers the transmission of the SRS resource set using the configured aperiodicSRS-ResourceTrigger (L1 DCI).

TABLE 9

```
-- ASN1START
-- TAG-MAC-CELL-GROUP-CONFIG-START
SRS-Config ::=                          SEQUENCE {
   srs-ResourceSetToReleaseList            SEQUENCE (SIZE(1..maxNrofSRS-ResourceSet
s)) OF SRS-ResourceSetId               OPTIONAL,   -- Need N
   srs-ResourceSetToAddModList             SEQUENCE (SIZE(1..maxNrofSRS-ResourceSet
s)) OF SRS-ResourceSet                 OPTIONAL,   -- Need N
   srs-ResourceToReleaseList               SEQUENCE (SIZE(1..maxNrofSRS-Resources))
OF SRS-ResourceId                      OPTIONAL,   -- Need N
   srs-ResourceToAddModList                SEQUENCE (SIZE(1..maxNrofSRS-Resources))
OF SRS-Resource                        OPTIONAL,   -- Need N
    tpc-Accumulation                            ENUMERATED {disabled}
        OPTIONAL,   -- Need S
    ...
}
SRS-ResourceSet ::=                     SEQUENCE {
    srs-ResourceSetId                       SRS-ResourceSetId,
    srs-ResourceIdList                      SEQUENCE (SIZE(1..maxNrofSRS-Re
sourcesPerSet)) OF SRS-ResourceId      OPTIONAL,   -- Cond Setup
    resourceType                                CHOICE {
      aperiodic                                     SEQUENCE {
         aperiodicSRS-ResourceTrigger                   INTEGER (1..maxNrofSRS-T
riggerStates-1),
         csi-RS
NZP-CSI-RS-ResourceId
            OPTIONAL,   -- Cond NonCodebook
         slotOffset                                     INTEGER
(1..32)
          OPTIONAL,   -- Need S
         ...
      },
      semi-persistent                               SEQUENCE {
         associatedCSI-RS                               NZP-CSI-RS-Resour
ceId                                                   OPTIONA
L, -- Cond NonCodebook
         ...
      },
      periodic                                      SEQUENCE {
         associatedCSI-RS                               NZP-CSI-RS-Resour
ceId                                                   OPTIONA
L, -- Cond NonCodebook
         ...
      }
    },
    usage                                       ENUMERATED (b
eamManagement, codebook, nonCodebook, antennaSwitching),
    alpha                                       Alpha
        OPTIONAL, -- Need S
    p0                                          INTEGER
(-202..24)
         OPTIONAL, -- Cond Setup
    pathlossReferenceRS                         CHOICE {
       ssb-Index                                    SSB-Index,
       csi-RS-Index                                 NZP-CSI-RS-Resour
ceId
SRS-SpatialRelationInfo ::=             SEQUENCE {
    servingCellId                               ServCellIndex,
                                                OPTIONAL,   -- Need S
    referenceSignal                             CHOICE {
       ssb-Index                                    SSB-Index,
       csi-RS-Index                                 NZP-CSI-RS-ResourceId,
       srs                                          SEQUEN
CE {
         resourceId                                     SRS-Reso
urceId,
         uplinkBWP                                      BWP-Id
       }
    }
}
SRS-ResourceId ::=                      INTEGER (0..maxNrofSRS-Resources-
1)
```

In Table 9, usage indicates a higher layer parameter indicating whether the SRS resource set is used for beam management, codebook-based or non-codebook-based transmission. The usage parameter corresponds to the L1 parameter 'SRS-SetUse'. 'spatialRelationInfo' is a parameter indicating the setting of the spatial relation between the reference RS and the target SRS. Here, the reference RS may be an SSB, CSI-RS, or SRS corresponding to the L1 parameter 'SRS-SpatialRelationInfo'.

The usage is set for each SRS resource set. Then, the terminal determines the Tx beam for the SRS resource to be transmitted based on the SRS-SpatialRelation Info included in the SRS-Config IE (S1020). Here, SRS-SpatialRelation Info is set for each SRS resource and indicates whether to apply the same beam as the beam used in SSB, CSI-RS, or SRS for each SRS resource. In addition, SRS-SpatialRelationInfo may or may not be set in each SRS resource. If SRS-SpatialRelationInfo is configured in the SRS resource, the same beam as the beam used in SSB, CSI-RS or SRS is applied and transmitted. However, if SRS-SpatialRelationInfo is not set in the SRS resource, the UE arbitrarily determines a Tx beam and transmits the SRS through the determined Tx beam (S1030). More specifically, for P-SRS in which 'SRS-ResourceConfigType' is set to 'periodic', (1) when SRS-SpatialRelationInfo is set to 'SSB/PBCH', the UE uses the spatial domain used for reception of SSB/PBCH The SRS resource is transmitted by applying the same spatial domain transmission filter as the Rx filter (or generated from the corresponding filter). Alternatively, (2) when SRS-SpatialRelationInfo is set to 'CSI-RS', the UE transmits an SRS resource having the same spatial domain transmission filter used for reception of periodic CSI-RS or SP CSI-RS. Alternatively, (3) when SRS-SpatialRelationInfo is set to 'SRS', the UE transmits the corresponding SRS resource by applying the same spatial domain transmission filter used for periodic SRS transmission. Even when 'SRS-ResourceConfigType' is set to 'SP-SRS' or 'AP-SRS', the same can be applied as above. Additionally, the terminal may or may not receive feedback on SRS from the base station as in the following three cases (S1040).

First, when Spatial_Relation_Info is configured for all SRS resources in the SRS resource set, the UE transmits the SRS through the beam indicated by the base station. For example, when Spatial_Relation_Info all indicate the same SSB, CRI, or SRI, the UE repeatedly transmits the SRS through the same beam. In this case, the base station corresponds to FIG. 17A for the purpose of selecting the Rx beam.

Second, Spatial_Relation_Info may not be set for all SRS resources in the SRS resource set. In this case, the UE can freely transmit while changing the SRS beam. That is, in this case, the UE selects the Tx beam and corresponds to FIG. 17B. Finally, Spatial_Relation_Info may be set only for some SRS resources in the SRS resource set.

In this case, for the configured SRS resource, the SRS is transmitted with the indicated beam, and for the SRS resource for which Spatial_Relation_Info is not configured, the UE can arbitrarily apply the Tx beam and transmit it.

MBMS (Multimedia Broadcast/Multicast Service)

Hereinafter, the MBMS method will be described. 3GPP MBMS can be divided into an SFN method in which a plurality of base station cells are synchronized and transmit the same data through a PMCH channel, and a Single Cell Point To Multipoint (SC-PTM) method in which a plurality of base station cells are synchronized and broadcast within a corresponding cell coverage through a PDCCH/PDSCH channel. The SFN scheme is used to provide a broadcast service in a wide area (e.g. MBMS area) through a resource allocated in advance semi-statically, and the SC-PTM scheme is mainly used to provide a broadcast service only within cell coverage through a dynamic resource.

SC-PTM provides one logical channel SC-MCCH (Single Cell Multicast Control Channel) and one or more logical channels SC-MTCH (Single Cell Multicast Traffic Channel). These logical channels are mapped to the transport channel DL-SCH and the physical channel PDSCH. A PDSCH transmitting SC-MCCH or SC-MTCH data is scheduled through a PDCCH indicated by G-RNTI. In this case, the TMGI corresponding to the service ID may be mapped one-to-one with a specific G-RNTI value. Accordingly, if the base station provides a plurality of services, a plurality of G-RNTI values may be allocated for SC-PTM transmission. One or a plurality of terminals may perform PDCCH monitoring using a specific G-RNTI to receive a specific service. At this time, it is possible to set the DRX on-duration period for SC-PTM only for a specific service/specific G-RNTI. In this case, the terminals wake up only for a specific on-duration period and perform PDCCH monitoring for the G-RNTI.

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

The above disclosure may be applied in combination with the methods proposed in the present disclosure to be described later, or may be supplemented to clarify the technical characteristics of the methods proposed in the present disclosure.

In the prior art, a base station can allocate a downlink SPS transmission resource that is repeated according to a set period by setting a UE-dedicated SPS configuration to a specific UE. In this case, the DCI of the UE-only PDCCH may indicate activation of a specific SPS configuration index (SPS activation) to instruct the UE to repeatedly receive SPS transmission resources according to a set period. This SPS transmission resource is used for initial HARQ transmission, and the base station may allocate a retransmission resource of a specific SPS configuration index through DCI of the UE-dedicated PDCCH. For example, when the UE reports HARQ NACK for SPS transmission resources, the base station allocates retransmission resources to DCI so that the UE can receive downlink retransmissions. Meanwhile, the DCI of the UE-only PDCCH may indicate deactivation (SPS release or SPS deactivation) of a specific SPS configuration index, and in this case, the UE does not receive the indicated SPS transmission resource. At this time, the CRC of the DCI for the activation/retransmission/deactivation is scrambled with a CS-RNTI.

REL-17 NR intends to introduce a DL broadcast or DL multicast transmission scheme to support a Multicast Broadcast Service (MBS) service similar to LTE MBMS. The base station provides a point-to-multipoint (PTM) transmission method and a point-to-point (PTP) transmission method for DL broadcast or DL multicast transmission. In the PTM transmission method for MBS, the base station transmits a group common PDCCH (Group Common PDCCH) and a group common PDSCH (Group Common PDSCH) to a plurality of UEs, and the plurality of UEs transmit the same group common PDCCH and group common PDSCH simultaneously It receives and decodes the same MBS data. On the other hand, in the PTP transmission method for MBS, the base station transmits the UE-dedicated PDCCH and the UE-dedicated PDSCH to a specific UE, and only the corresponding UE receives the UE-dedicated PDCCH and the UE-dedicated PDSCH. In this case, when there is a plurality of UEs receiving the same MBS service, the base station separately transmits the same MBS data to individual UEs through different UE-dedicated PDCCHs and UE-dedicated PDSCHs.

Meanwhile, in the PTM transmission method, the base station transmits a plurality of group common PDSCHs to the UEs. In this case, the base station may receive the HARQ-ACK of the individual UE for the group common PDSCH through the UE-dedicated PUCCH resource. In the prior art, the HARQ-ACK for the unicast PDSCH was transmitted to the base station using PUCCH-config set by RRC, PRI (PUCCH Resource Indicator) indicated by DCI, and UE-specific PUCCH resource determined by K1. However, since transmission of the group common PDSCH is scheduled with the group common DCI, it is difficult to allocate a dedicated PUCCH resource for the UE.

Therefore, in the present disclosure, in order to support HARQ-ACK transmission of individual UEs in a group for group common PDSCH transmission, a UE-specific PUCCH resource allocation scheme according to UE-specific RRC configuration and group common DCI indication is proposed.

Method 1: Method of allocating PUCCH resources of PUCCH-config for multicast to PRI and K1 of DCI Method 2: A method of selecting a PUCCH resource for MBS HARQ-ACK from among the periodically allocated PUCCH resources for MBS Method 3: A method of distributing PUCCH resources for MBS HARQ-ACK among PUCCH resources for MBS according to the number of UEs receiving the same TB Method 4: A method for mapping the PRI of DCI with one or a plurality of TCI states for PUCCH transmission Method 5: MBS HARQ-ACK transmission method using UE-dedicated DCI for scheduling unicast PDSCH Method 6: Method of allocating PUCCH resources of PUCCH-config for unicast corresponding to PRI and K1 of DCI Method 7: When a plurality of PUCCHs are simultaneously transmitted, a method of allocating PUCCH resources of PUCCH-config for unicast corresponding to PRI and K1 of DCI Method 8: When a plurality of PUCCHs are not transmitted simultaneously, a method of allocating PUCCH resources of PUCCH-config for unicast corresponding to PRI and K1 of DCI For PTM scheme 1, group common DCI indicates a single PUCCH resource indicator and a single PDSCH-to-HARQ_feedback timing indicator. For UE specific PUCCH resource allocation, different UEs in the group can be configured with different values of at least PUCCH-Resource and dl-DataToUL-ACK in UE dedicated PUCCH-config for multicast. So, different UEs may be allocated with different PUCCH resources by the PUCCH resource indicator and the PDSCH-to-HARQ_feedback timing indicator of the group common DCI.

Hereinafter, the HARQ-ACK transmission method of the present disclosure will be described in detail. In the present disclosure, MBS HARQ-ACK means HARQ-ACK for PTM PDSCH-based MBS service downlink transmission and/or HARQ-ACK for PTP PDSCH-based MBS service downlink transmission.

Figure 19:
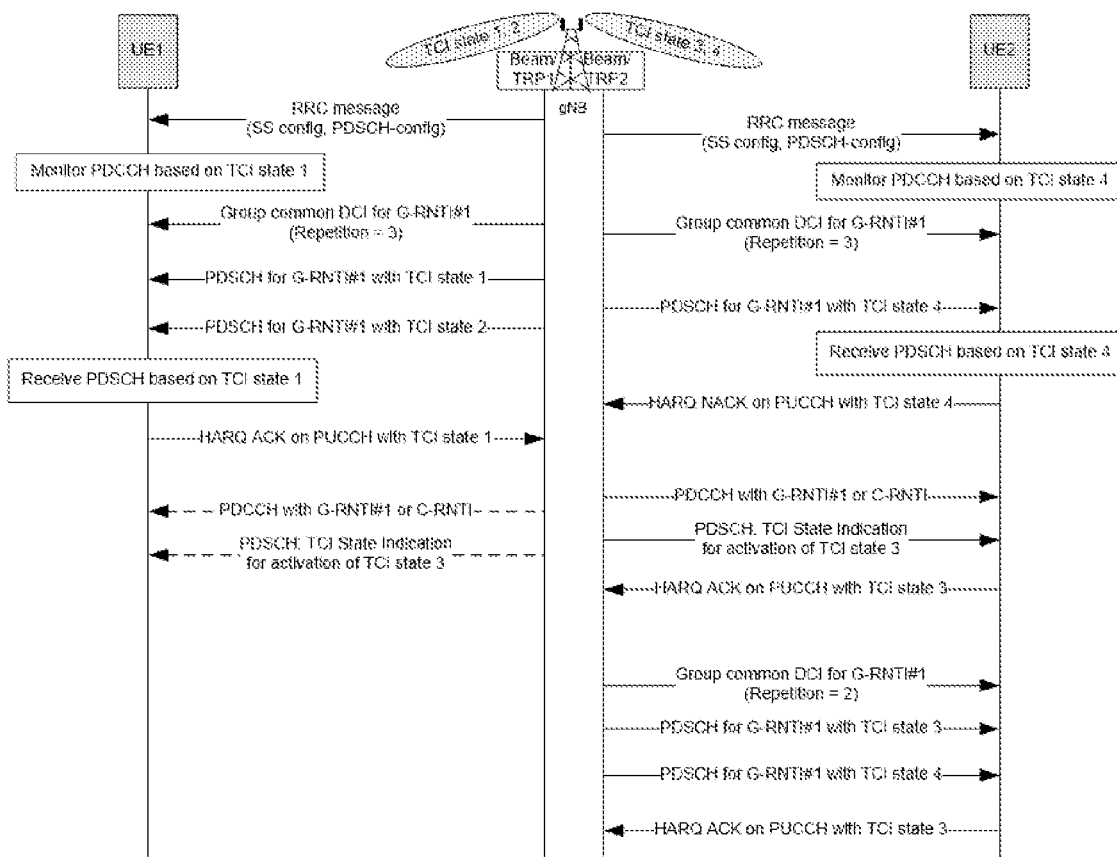
FIG. 19 illustrates an example of MBS HARQ-ACK transmission according to the present disclosure.

FIG. 19 illustrates an example of MBS HARQ-ACK transmission according to the present disclosure.

1. UE enters RRC_CONNECTED mode and reports a message indicating one or more interested MBS services to gNB.

A. The message is carried over one of UCI (Uplink Control Information), MAC CE (Control Element) and RRC message.

B. The interested MBS service in the message refers to one of TMGIs or one of G-RNTIs listed in a DL message received from gNB.

For example, the DL message is a service availability message listing TMGI #1, TMGI #3, TMGI #5 and TMGI #10. If UE is interested in TMGI #5, UE indicates the order of TMGI #5 in the message, i.e. UE reports '3' to the gNB For example, the DL message is a service availability message listing G-RNTI #1, G-RNTI #3, G-RNTI #5 and G-RNTI #10. If UE is interested in G-RNTI #10, UE indicates the order of G-RNTI #10 in the message, i.e. UE reports '4' to the gNB.

2. Upon receiving the message, gNB provides CFR configuration, one or more group common PDSCH configurations including TCI states for one or more G-RNTI values, search space configuration including TCI states for one or more G-RNTI value(s) to the UE by a RRC message. Upon receiving the RRC message, UE configures one or more group common SPS configurations according to the RRC message.

A. The RRC message can be group common message transmitted on PTM MCCH (Multicast Control Channel) or UE dedicated message transmitted on UE specific DCCH (Dedicated Control Channel)

B. UE is configured at least with a G-RNTI value for each MBS CFR (common frequency resource) or each serving cell. GC-CS-RNTI can be also configured and used for activation, retransmission or release of one or more group common SPS configurations.

If UE is not configured with a GC-CS-RNTI for a CFR or a serving cell, UE uses CS-RNTI for activation, retransmission or release of one or more group common SPS configurations, if CS-RNTI has been configured for the CFR or the serving cell.

gNB can associate a list of TMGIs or a list of G-RNTIs to one GC-CS-RNTI value. In this case, gNB provides the list of TMGIs or the list of G-RNTIs which is associated to the GC-CS-RNTI value.

C. Each PDSCH configuration (i.e. PDSCH-config) consists of at least the following information elements for multicast and/or broadcast:

TABLE 10

```
PDSCH-Config ::= SEQUENCE {
dataScramblingIdentityPDSCH INTEGER (0..1023) OPTIONAL, -- Need S
dmrs-DownlinkForPDSCH-MappingTypeA  SetupRelease  { DMRS-
DownlinkConfig } OPTIONAL, -- Need M
dmrs-DownlinkForPDSCH-MappingTypeB  SetupRelease  { DMRS-
DownlinkConfig } OPTIONAL, -- Need M
tci-StatesToAddModList SEQUENCE (SIZE(1..maxNrofTCI-States)) OF TCI-
State OPTIONAL, -- Need N
tci-StatesToReleaseList SEQUENCE (SIZE(1..maxNrofTCI-States)) OF TCI-
StateId OPTIONAL, -- Need N
vrb-ToPRB-Interleaver ENUMERATED {n2, n4} OPTIONAL, -- Need S
resourceAllocation  ENUMERATED  { resourceAllocationType0,
resourceAllocationType1, dynamicSwitch},
```

TABLE 10-continued

```
pdsch-TimeDomainAllocationList  SetupRelease  {  PDSCH-
TimeDomainResourceAllocationList } OPTIONAL, -- Need M
pdsch-AggregationFactor ENUMERATED { n2, n4, n8 } OPTIONAL, -- Need S
rateMatchPatternToAddModList  SEQUENCE  (SIZE
(1..maxNrofRateMatchPatterns)) OF RateMatchPattern OPTIONAL, -- Need N
rateMatchPatternToReleaseList  SEQUENCE  (SIZE
(1..maxNrofRateMatchPatterns)) OF RateMatchPatternId OPTIONAL, -- Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
...
}
```

One or more TMGIs are configured and associated with tci-StatesToAddModList. If PDSCH transmission is mapped to a TMGI associated with tci-StatesToAddModList, the PDSCH transmission is associated with the tci-StatesToAddModList One or more G-RNTIs are configured and associated with tci-StatesToAddModList. If PDSCH transmission is mapped to a MBS service of the G-RNTI associated with tci-StatesToAddModList, the PDSCH transmission is associated with the tci-StatesToAddModList.

A value of GC-CS-RNTI or CS-RNTI is configured and associated with tci-StatesToAddModList. If a PDSCH transmission is mapped to the value of GC-CS-RNTI or CS-RNTI associated with tci-StatesToAddModList, the PDSCH transmission is associated with the tci-StatesToAddModList One or more HARQ Process IDs are associated with tci-StatesToAddModList. If PDSCH transmission is mapped to HARQ Process ID associated with tci-StatesToAddModList, the PDSCH transmission is associated with the tci-StatesToAddModList.

3. If a search space has been configured for the configured CFR, UE monitors PDCCH on the configured SS (search space) in the configured CFR to receive DCI of which CRC is scrambled with G-RNTI or GC-CS-RNTI.

A. For the configured SS, UE determines the TCI state(s) of PDCCH DM-RS to monitor PDCCH on CORESET addressed by a CORESET ID on the configured SS as follows:

Option 3A: UE determines one or more TCI states in TCI state list configured by the RRC message for the configured SS and/or G-RNTI(s)/TMGI(s) which UE is interested to receive. If only one TCI state is configured on the CORESET by TCI state list, UE in RRC_CONNECTED monitors PDCCH on CORESET of the configured SS with the TCI state configured for the CORESET ID of the CORESET by the RRC message.

Option 3B: UE determines one or more TCI states indicated by UE specific MAC CE among all TCI states configured by the RRC message. UE in RRC_CONNECTED monitors PDCCH on CORESET of the configured SS with the TCI state indicated for the CORESET ID of the CORESET in 'TCI State Indication for UE-specific MAC CE' among TCI state list associated to G-RNTI(s)/TMGI(s) which UE is interested to receive as described above or TCI state list in CORESET configuration of the CORESET ID for the CFR or this UE.

The Serving Cell ID of 'TCI State Indication for UE-specific MAC CE' shown below indicates the identity of the Serving Cell for which the MAC CE applies. The Serving Cell ID corresponds to the serving cell associated to the CFR or the serving cell of UE's active BWP associated to the CFR. The Serving Cell ID field can be replaced by CFR ID of the CFR. For indication to the TCI state of group common PDCCH with GC-CS-RNTI/CS-RNTI, the Serving Cell ID field can be replaced by G-RNTI configured by the RRC message.

Figure 20:
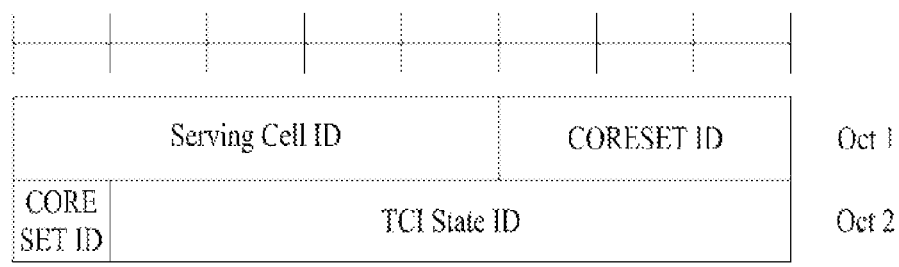
FIG. 20 illustrates an example of TCI State Indication for UE-specific MAC CE.

FIG. 20 illustrates an example of TCI State Indication for UE-specific MAC CE.

Option 3C: UE determines one or more TCI states indicated by group common MAC CE among all TCI states configured by the RRC message. UE in RRC_CONNECTED monitors PDCCH on CORESET of the configured SS with the TCI state indicated for the CORESET ID of the CORESET in 'TCI State Indication for Group Common MAC CE' among tci-StatesToAddModList associated to the G-RNTI/TMGI as described above or TCI state list in CORESET configuration of the CORESET ID for the CFR or this UE.

PDSCH carrying a group common MAC CE such as 'TCI State Indication for Group Common MAC CE' is scheduled by DCI of which CRC is scrambled by G-RNTI or GC-CS-RNTI or CS-RNTI.

If PDSCH carrying the group common MAC CE is scheduled by DCI of which CRC is scrambled by G-RNTI, UE considers that the group common MAC CE applies to group common DCI reception with G-RNTI or UE specific DCI reception associated to G-RNTI (e.g. PTP retransmission for G-RNTI) or SPS (re)activation DCI associated to G-RNTI or SPS retransmission DCI associated to G-RNTI. For example, If PDSCH carrying 'TCI State Indication for Group Common MAC CE' is scheduled by DCI of which CRC is scrambled by G-RNTI, UE considers the TCI state indicated by the MAC CE is applied to group common DCI reception with G-RNTI or SPS retransmission DCI associated to G-RNTI.

Figure 21:
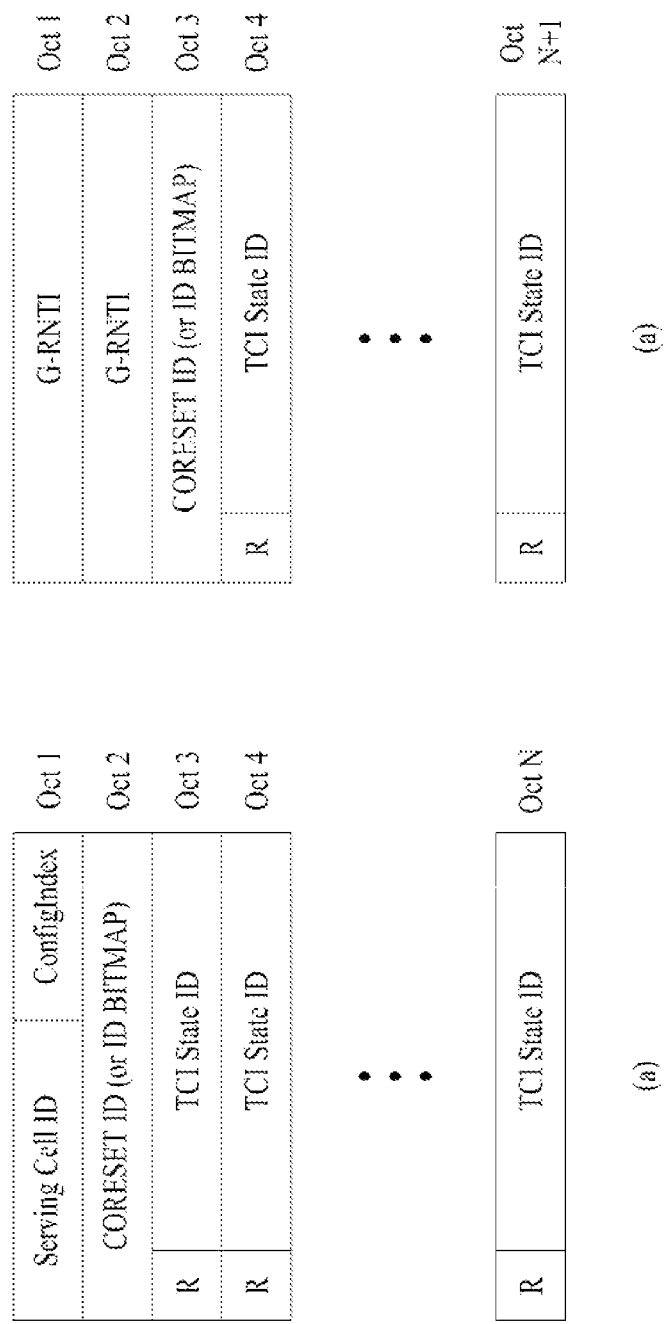
FIG. 21 illustrates examples of TCI State Indication for Group Common MAC CE.

Two options of MAC CE formats for 'TCI State Indication for Group Common MAC CE' are shown in FIG. 21(a) and FIG. 21(b). The Serving Cell ID field in the MAC CE indicates the identity of the Serving Cell for which the MAC CE applies. The Serving Cell ID corresponds to the serving cell associated to the CFR or the serving cell of UE's active BWP associated to the CFR. ConfigIndex field indicates CFR ID of the CFR or short ID of TMGI configured by the RRC message.

If CORESET ID field is included in 'TCI State Indication for Group Common MAC CE', up to N-2 TCI State ID fields can be added to indicate one or more TCI states activated for the CORESET of the CORESET ID either for the Serving Cell ID and ConfigIndex field or for the G-RNTI field.

Alternatively, instead of CORESET ID field, CORESET ID BITMAP field indicates 8 CORESET IDs, i.e. CORE- SET ID=0, 1, 2, . . . and 7. Each bit of CORESET ID BITMAP field indicates whether the TCI state ID of the corresponding CORESET ID configured for the configured SS is added in this MAC CE. If CORESET ID BITMAP field is not included in this MAC CE. 8 TCI state ID fields are included in this MAC CE for 8 CORESET IDs in the increasing order of CORESET ID. If the Serving Cell ID field and the ConfigIndex field are included, each TCI state ID indicates the TCI state for the CORESET ID for the Serving Cell ID field and the ConfigIndex field. If G-RNTI field is included, each TCI state ID indicates the TCI state for the CORESET ID for the G-RNTI in the increasing order of CORESET ID. The G-RNTI field can be replaced by TMGI field. In this case, each TCI state ID indicates the TCI state for the CORESET ID for TMGI in the increasing order of CORESET ID.

FIGS. 21A and 21B illustrate examples of TCI State Indication for Group Common MAC CE.

B. UE receives PDCCH on CORESET addressed by a CORESET ID on the configured SS with the determined TCI state determined for the CORESET ID as follows:

If only one TCI state is determined to monitor PDCCH with G-RNTI, UE receives PDCCH with the determined TCI state.

If more than one TCI state is determined to monitor PDCCH with G-RNTI, UE select one or more TCI states to receives PDCCH as follows:

1) UE autonomously selects only one TCI state or a few TCI states among the determined TCI states.

2) UE selects one TCI state with the lowest (or highest) TCI State ID among the determined TCI states.

3) UE selects all determined TCI states.

4) UE selects only one or more determined TCI states corresponding to the TCI state(s) that has selected for UE specific PDCCH with C-RNTI or other RNTI 5) UE selects only one or more determined TCI states of RS(s) of which measured quality is above a threshold set by gNB.

6) UE selects only one determined TCI state of RS of which measured quality is best among all determined TCI states.

If multiple CORETSETs are configured for same or different CORESET IDs on the configured SS, UE may select one or multiple different TCI states. If multiple different TCI states are selected for multiple CORESETs for same or different CORESET IDs, UE maps different TCI states to different CORESETs of same or different CORESET IDs as follows:

Option 3-1: same value of IDs are mapped, i.e. TCI state ID #k is mapped to CORESET ID #k within a duration (k=0, 1, 2 . . . )

Option 3-2: kth TCI state ID in the increasing order of TCI state IDs is mapped to kth CORESET ID in the increasing order of CORESET IDs within a duration (k=1, 2 . . . )

Option 3-3: mapping between TCI state IDs and CORESET IDs is configured by the RRC message or UE specific MAC CE or group common MAC CE.

After mapping different TCI states to different CORESETs of same or different CORESET IDs, UE receives one or more CORESETs mapped to the selected TCI state(s) to monitor PDCCH for GC-CS-RNTI, CS-RNTI or G-RNTI.

4. If a data unit is available on a MTCH of a MRB for a MBS service, gNB constructs and transmits a TB including the data unit for a SPS PDSCH occasion associated to the MTCH of the MRB for the MBS service, or associated to TMGI of the MBS service, or associated to a short ID of the MBS service, or associated to G-RNTI mapped to the MBS service, according to the service-to-resource mapping.

For group common dynamic scheduling of the TB, gNB transmits DCI on PDCCH to UE. CRC of the DCI is scrambled by G-RNTI or GC-CS-RNTI or CS-RNTI. The PDCCH is group common PDCCH or UE specific PDCCH.

The DCI includes the following fields:

Identifier for DCI formats

This field may indicate MBS specific DCI format or one of the existing DCI format for MBS Carrier indicator This field indicates either the (serving or MBS specific) cell of the CFR or the serving cell of the UE's active BWP associated to the CFR where group common PDCCH/PDSCH is transmitted.

Bandwidth part indicator

This field indicates either the BWP ID assigned to the CFR or the BWP ID of the UE's active BWP associated to the CFR where group common PDCCH/PDSCH is transmitted.

Frequency domain resource assignment

Time domain resource assignment

VRB-to-PRB mapping

PRB bundling size indicator

Rate matching indicator

ZP CSI-RS trigger

Modulation and coding scheme

New data indicator (NDI)

Redundancy version

HARQ process number

Downlink assignment index

TPC command for scheduled PUCCH

PUCCH resource indicator

PDSCH-to-HARQ_feedback timing indicator

Antenna port(s)

Transmission configuration indication

SRS request

DMRS sequence initialization

Priority indicator

For group common dynamic scheduling, gNB provides one or more of the following service-to-resource mappings for a MBS service identified by a TMGI or a G-RNTI or a GC-CS-RNTI to UE by group common or UE specific RRC message or by group common or UE specific MAC CE. Data of the MBS service is carried on a MBS radio bearer (MRB) of a multicast traffic logical channel, i.e. MTCH associated to the MBS service. The RRC message can be group common message transmitted on PTM MCCH (Multicast Control Channel) or UE dedicated message transmitted on UE specific DCCH (Dedicated Control Channel) The DCI scheduling PDSCH carrying the MBS service data may also indicate one or more of a short ID, a MTCH ID, a MRB ID, a G-RNTI value and a TMGI value for the MBS service.

5. For reception of PDCCH scheduling Nth HARQ transmission of the TB, UE selects a TCI state for group common PDCCH as follows:

Option 5-1: UE selects the TCI state configured by UE specific RRC reconfiguration (typically for FR1)

1) gNB does not provide mapping between all CORESETs and all TCI states for G-RNTI 2) Upon receiving UE specific RRC reconfiguration, UE monitors the reconfigured MO or CORESET at least for multicast service according to the TCI state configured by UE specific RRC reconfiguration.

Option 5-2: UE selectively monitors one or more of MOs (Monitoring Occasions) and CORESET(s) associated to the selected TCI state (for FR2)

1) gNB provides UE with mapping between all CORESETs and all TCI states for G-RNTI by RRC 2) Multiple CORESET/SSs or different MOs are configured for different TCI states 3) UE autonomously selects MO or CORESET based on the selected TCI state at least for broadcast service 4) Note that idle/inactive UEs already support Option 2 for broadcast.

Option 5-3: gNB informs UE about mapping between G-RNTI and TCI state. Then, UE selects G-RNTI among multiple G-RNTIs mapped to same TB based on the selected TCI state 1) Different G-RNTIs are mapped to different TCI states 6. Upon receiving the DCI of which CRC is scrambled by G-RNTI which UE is interested to receive, UE determines MBS service(s) associated to one or more of a short ID, a MTCH ID, a MRB ID, a G-RNTI value and a TMGI value for each of the PDSCH occasions, based on mapping between MBS services and HPNs (HARQ Process Numbers) indicated in the DCI, and/or mapping between MBS services and, if available, short ID(s) indicated in the DCI.

Then, if UE is interested in the determined MBS service (s), UE receives PDSCH transmission scheduled by the DCI. If UE is not interested in the determined MBS service(s), UE does not receive PDSCH transmission scheduled by the DCI. Depending on the decoding status of PDSCH transmission, UE sends HARQ feedback to gNB.

7. gNB may set tci-PresentInDCI to 'enabled' or configure tci-PresentDCI-1-2 for a CORESET for group common PDCCH.

tci-PresentInDCI

This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in the scheduling cell (see TS 38.214 [19], clause 5.1.5).

tci-PresentDCI-1-2

Configures the number of bits for "Transmission configuration indicator" in DCI format 1_2. When the field is absent the UE applies the value of 0 bit for the "Transmission configuration indicator" in DCI format 1_2 (see TS 38.212, clause 7.3.1 and TS 38.214, clause 5.1.5)

8. If tci-PresentInDCI is set to 'enabled' or tci-PresentDCI-1-2 is configured for the CORESET scheduling the group common PDSCH, and the time offset between the reception of the DL DCI and the corresponding PDSCH is equal to or greater than timeDurationForQCL if applicable, after a UE receives an initial higher layer configuration of TCI states and before reception of the activation command i.e. TCI State Indication for Group Common MAC CE or for UE specific MAC CE which activates a TCI state, Option 7-1: the UE assumes that the TCI state or the QCL assumption for the group common PDSCH is identical to the TCI state or QCL assumption whichever is applied for the CORESET used for the group common PDCCH transmission within the CFR.

Option 7-2: If default TCI state is configured by RRC, the UE assumes that the TCI state or the QCL assumption for the group common PDSCH is identical to the default TCI state.

Option 7-3: the UE may assume that the DM-RS ports of group common PDSCH of the CFR are quasi co-located with the SS/PBCH block determined in the previous RACH (e.g. during initial access) with respect to qcl-Type set to 'typeA', and when applicable, also with respect to qcl-Type set to 'typeD'.

If the group common PDSCH is scheduled by a DCI format not having the TCI field present, and the time offset between the reception of the DL DCI and the corresponding PDSCH of the CFR is equal to or greater than a threshold timeDurationForQCL if applicable for determining PDSCH antenna port quasi co-location, the UE assumes that the TCI state or the QCL assumption for the group common PDSCH is identical to the TCI state or QCL assumption whichever is applied for the CORESET used for the group common PDCCH transmission within the CFR.

The threshold timeDurationForQCL is based on UE's own UE capability reported to gNB, The threshold timeDurationForQCL is based on the lowest UE capability that can be reported to gNB or configured for the CFR by gNB The threshold timeDurationForQCL is based on the threshold configured by gNB.

Independent of the configuration of tci-PresentInDCI and tci-PresentDCI-1-2, regardless of whether PDCCH/PDSCH is group common or UE specific, if the offset between the reception of the DL DCI and the corresponding PDSCH is less than the threshold timeDurationForQCL, the UE assumes that the TCI state or the QCL assumption for PDSCH is identical to the TCI state or QCL assumption whichever is applied for the CORESET used for PDCCH transmission for a CFR, a BWP or a cell. In this case, the threshold timeDurationForQCL is determined as follows:

The threshold timeDurationForQCL is based on UE's own UE capability reported to gNB, The threshold timeDurationForQCL is based on the lowest UE capability that can be reported to gNB or configured for the CFR, the BWP or the cell by gNB The threshold timeDurationForQCL is based on the threshold configured by gNB.

9. If the pdsch-AggregationFactor is configured, the TB scheduled by group common DCI can be repeated for Nth HARQ transmission of a TB within each symbol allocation among each of the pdsch-AggregationFactor consecutive slots, if configured.

In this case, same or different TCI states can be configured for different slots of the repetition. Group common/UE specific MAC CE can be used to activate/deactivate TCI states or reconfigure mapping between TCI states and repetitions.

If group common DCI can indicate the number of repetitions for PDSCH for Nth HARQ transmission of a TB, same or different TCI states can be configured for different slots of the repetition. The DCI can be used to activate/deactivate TCI states or reconfigure mapping between TCI states and repetitions.

For dynamic scheduling, the DCI schedules initial transmission or retransmission of group common PDSCH transmission(s).

For semi-persistent scheduling, the DCI (de-)activates a group common SPS configuration or schedules retransmission of group common PDSCH transmission(s).

gNB informs UE about mapping between a PDSCH transmission occasion and a TCI state by RRC message or Group common MAC CE or UE specific MAC CE.

Option 1: Different HARQ Process IDs are mapped to different TCI states

For example, DCI indicating HPN #1 schedules PDSCH for TCI state ID #1 while DCI indicating HPN #2 schedules PDSCH for TCI state ID #2.

Option 2: Different repetitions of PDSCH transmission are mapped to different TCI states for Nth HARQ transmission For example, the first PDSCH repetition and the second PDSCH repetition of a TB scheduled by one DCI indicating 2 repetitions are transmitted with different TCI states.

Option 3: Different PDSCH occasions are mapped to different TCI states

A. For example, TCI state ID #1 is used for group common PDSCH transmissions in SFN mod M=1 while TCI state ID #2 is used for group common PDSCH transmissions in SFN mod M=2

B. For example, different PDSCH transmissions in different slots are mapped to different TCI states. Different PDSCH transmissions in a same slot are mapped to same TCI state.

UE selects TCI state for group common PDSCH scheduled by group common DCI according to the above mapping between PDSCH transmission occasions and TCI states.

10. If decoding the TB on the PDSCH transmission occasion is unsuccessful, UE sends HARQ NACK to gNB on a PUCCH resource in the configured UL CFR, for example, according to PUCCH configuration received by the RRC message, and PUCCH resource indicator and PDSCH-to-HARQ_feedback timing indicator received by the retransmission DCI. The PUCCH is transmitted with the TCI state that is indicated by the DCI, or equal to the TCI state of the CORESET where the DCI was received, or equal to the TCI state of the PDSCH transmission.

For HARQ-ACK transmission of Step 10, the base station may preset PUCCH-config with an RRC message. In this case, when the UE receives the MBS service, the base station may preset a separate PUCCH-config for mulicast for MBS HARQ-ACK in addition to the PUCCH-config for unicast provided in the prior art.

When ACK/NACK-based HARQ-ACK and PUCCH-config for multicast are configured, the UE determines a PUCCH resource for MBS HARQ-ACK transmission in one or more of the following ways.

Method 1: Method of allocating PUCCH resources of PUCCH-config for multicast to PRI and K1 of DCI Upon receiving group common DCI indicating multiple PUCCH resources for MBS HARQ-ACK, UE transmits HARQ-ACK on PUCCH after a PDSCH reception scheduled by the DCI as follows:

PRI (PUCCH Resource Indicator) can be indicated by Group common DCI as follows:

Option 1A-1: A list of UE specific PRIs is included in the DCI
  Each PRI in the list indicates the corresponding entry to a candidate pucch-ResourceId value in PUCCH-config for allocation of a same PUCCH resource or different PUCCH resources for different UEs in the group which received the same DCI. Different PRIs in DCI can indicate different entries in PUCCH-config.
  candidate pucch-ResourceId values are configured by RRC and different pucch-ResourceId values can be set for different UEs in the same group at least in multicast PUCCH-config.
Option 1A-2: Group common PRI is included in the DCI
  The single group common PRI indicates the corresponding entry to a candidate pucch-ResourceId value in UE specific PUCCH-config for allocation of same or different PUCCH resources for all UEs in the group
  candidate pucch-ResourceId values are configured by RRC and different pucch-ResourceId values can be set for different UEs in the same group at least in PUCCH-config for multicast.

K1 (PDSCH-to-HARQ_feedback timing indicator) can be indicated by Group common DCI as follows:

Option 1B-1: A list of UE specific K1 value is included in the DCI
  Each K1 in the list indicates same UL slot or different UL (sub-)slots for different UEs in the group
  Example 1: Different K1 values are allocated to different UEs e.g. K1-UE1, K2-UE2, K3-UE3 . . . .
  Example 2: K1 values can be shared by multiple UEs, e.g K1-UE1/UE2, K2-UE3/UE4
  Example 3: One K1 value is a reference and other K1 values are allocated based on the reference, e.g. {K1_ref, a list of K1_offset} is indicated in the DCI.
  UE1 uses K1_ref
  UE2 uses K1_ref+K1_offest1
  UE3 uses K1_ref+K1_offest2
Option 1B-2: Group common K1 value is included in the DCI
  The single K1 value indicates the corresponding entry to a candidate dl-DataToUL-ACK values in UE specific PUCCH-config for allocation of same or different PUCCH resources for all UEs in the group receiving the DCI.
  Candidate dl-DataToUL-ACK values are configured by RRC and can be different for different UEs in the same group at least in PUCCH-config for multicast.
  Even when K1 of DCI is common to UE, the candidate dl-DataToUL-ACK value to which the K1 value is mapped may be set differently for each UE, and thus different PUCCH resources may be used for each UE. That is, since the PUCCH-config for setting the candidate value may be dedicated to the UE, a plurality of UEs may interpret the PDSCH-to-HARQ_feedback timing value as different even if the DCI K1 value is the same.
  The base station determines that the candidate dl-DataToUL-ACK value and PUCCH—of PUCCH-config for uncast are interpreted as different PDSCH-to-HARQ_feedback timing values even if K1 of group common DCI and K1 of UE specific DCI are the same for a specific UE. Candidate dl-DataToUL-ACK value of config for multicast can be set differently. Accordingly, HARQ-ACK for multicast and HARQ-ACK for unicast (or HARQ-ACK for PTM and HARQ-ACK for PTP) can be transmitted through different PUCCH resources.
  Meanwhile, the base station may set candidate dl-DataToUL-ACK values of PUCCH-config for multicast to different values for different TMGIs or G-RNTIs. Therefore, when DCIs in which CRCs are scrambled with different G-RNTIs are received, HARQ-ACKs for different services (i.e. different TMGIs) may be transmitted through different PUCCH resources even if these DCIs indicate the same K1 value.

Upon receiving UE specific DCI scheduling PTP transmission and indicating a PUCCH resource for MBS HARQ-ACK to PTP transmission, UE transmits HARQ-ACK on PUCCH after a PDSCH reception scheduled by the DCI as follows:

PRI (PUCCH Resource Indicator) can be indicated by the DCI as follows:

Option 2A-1: If new MBS specific PRI is included in DCI, new MBS specific PRI indicates a PUCCH resource in PUCCH-config for multicast.
  If PUCCH-config for multicast is not configured by gNB, UE applies PUCCH-config for unicast for mapping a PRI value in DCI to a candidate pucch-ResourceId value.

Option 2A-2: Rel-15/16 PRI indicates a PUCCH resource in PUCCH-config for multicast
  If PUCCH-config for multicast is not configured by gNB, UE applies PUCCH-config for unicast for mapping a PRI value in DCI to a candidate pucch-ResourceId value.
K1 (PDSCH-to-HARQ_feedback timing indicator) can be indicated by the DCI as follows:
  If new MBS K1 is included in DCI, it indicates a UL slot in PUCCH-config for multicast
  If PUCCH-config for multicast is not configured by gNB, UE applies PUCCH-config for unicast for mapping a K1 value in DCI to a candidate dl-DataToUL-ACK value.
  Rel-15/16 K1 indicates a UL slot in PUCCH-config for multicast
  If PUCCH-config for multicast is not configured by gNB, UE applies PUCCH-config for unicast for mapping a K1 value in DCI to a candidate dl-DataToUL-ACK value.
Method 2: Method of selecting a PUCCH resource for MBS HARQ-ACK from among periodically allocated PUCCH resources for MBS
  gNB configures UE specific periodic PUCCH resources of which a PUCCH resource is implicitly or explicitly allocated by DCI scheduling PTM/PTP PDSCH. In order to receive PTM/PTP PDSCH scheduled by DCI, UE determines a PUCCH resource among periodic PUCCH resources implicitly or explicitly. UE should ensure that the determined PUCCH resource meets processing time for PUCCH transmission after a PDSCH reception. In this case, if PRI and/or K1 are included in the DCI, UE ignores both PRI and K1 in the DCI for PUCCH carrying MBS HARQ-ACK.
Method 2-1: Transmission of MBS HARQ-ACK with PUCCH resources allocated for each specific period set as RRC
  It is assumed that the UE transmits only PTM/PTP PDSCH for up to M TBs in TDM/FDM/SDM per specific period (e.g. every N consecutive slots). For example, when M=1 in repeated transmission of PDCCH/PDSCH for the same TB1, the transmission is downlinked in the order of TB1-TB1-TB1-TB1. Or, when M=3 in repeated transmission of PDCCH/PDSCH for other TB1, TB2, TB3, it is periodically transmitted in a {TB1-TB2-TB3-TB 1-TB2-TB3} pattern, or {TB1-TB1-TB2-TB2-TB3-TB3} pattern may be transmitted periodically.
  In this way, when the Group common PDCCH is expected to be transmitted according to a 100 ms period, a periodic PUCCH resource may be allocated according to a 100 ms period or may be allocated according to a 50 ms or 200 ms period. That is, the PUCCH period may be set as a multiple or a divisor of the expected Group Common PDCCH period. For example, if transmission of up to 3 TBs is expected during a specific period, PUCCH resources may be allocated according to one of the following orders. In an example, it may mean different slots or sub-slots in which each TB or PUCCH is transmitted and received.
    Example 1: {TB 1-TB2-TB3-PUCCH-TB1-TB2-TB3-PUCCH}
    Example 2: {TB 1-TB2-PUCCH-TB3-TB1-PUCCH-TB2-TB3-PUCCH}
    Example 3: {TB 1-TB1-PUCCH-TB2-TB2-PUCCH-TB3-TB3-PUCCH}
    Example 4: {TB 1-TB1-TB2-PUCCH-TB2-TB3-TB3-PUCCH}
  In this way, when the UE has already successfully received M TBs in one period, the UE may skip receiving additional group common DCI or PTP DCI within the period. In addition, PUCCH transmission for additional DCI may be skipped.
Method 2-2: DCI indicates one of periodic PUCCH resources allocated to RRC
  The PRI of the DCI for scheduling the PTM/PTP PDSCH indicates one of the periodic PUCCH resources allocated within a predetermined time.
  For example, DCI indicates one of multiple periodic PUCCH resources existing within a specific time interval after PDSCH transmission as an index. For example, the closest PUCCH resource within 10 slots after the DCI reception time is index=0, and the second closest PUCCH resource is index=1.
  On the other hand, when DCI does not indicate one index, the UE assumes that the closest PUCCH resource in consideration of the processing time of the UE among multiple periodic PUCCH resources is indicated.
  If the PDCCH and PDSCH transmission scheduling one TB transmission are successfully received, if the DCI of the received PDCCH indicates the PUCCH resource, the UE does not receive the PDCCH and PDSCH transmission scheduling the same TB transmission.
  On the other hand, a specific PRI value of DCI may indicate enabling or disabling of HARQ feedback.
  For example, even if there are periodic PUCCH resources allocated to RRC, the base station may indicate enabling or disabling of HARQ-ACK for a specific PDSCH through DCI scheduling the specific PDSCH. When the DCI indicates disabling of the HARQ-ACK, the UE does not transmit the HARQ-ACK for the PDSCH transmission scheduled by the DCI even if there is a periodic PUCCH resource.
  Meanwhile, for a plurality of HARQ retransmissions for the same TB, HARQ feedback for the same TB may be enabled or disabling at the time of HARQ retransmission. For example, only the DCI of the 4th or 6th retransmission with respect to a TB that is retransmitted all 8 times may indicate enabling of HARQ feedback, and the rest may disabling HARQ feedback by indicating a specific PRI value. In this case, a PRI value other than a specific PRI value may mean HARQ enabling.
  On the other hand, even if the UE has already successfully received the TB in the N-th transmission of a certain TB, if the DCI for the N-th transmission does not include the PRI, the UE receives the PRI through the DCI for the N+i-th transmission, and transmits ACK.
Method 3: A method of distributing PUCCH resources for MBS HARQ-ACK among PUCCH resources for MBS according to the number of UEs receiving the same TB
  Method 3-1: A method of distributing PUCCH resources according to the number of UEs based on symbols Method 3-1A: different startingSymbolIndex with same nrofSymbols for different UEs by RRC
    The base station sets the starting symbol startingSymbolIndex of the PUCCH resource differently for different UEs through the UE-specific RRC message. In this case, the total number of symbols nrofSymbols of the PUCCH resource is set to the same value for all UEs in the group.

Method 3-1B: different startingSymbolIndex with same nrofSymbols for different UEs by DCI DCI for scheduling PTM/PTP PDSCH for a specific G-RNTI indicates the number of UEs in a cell that receive transmission for that G-RNTI. DCI may indicate the exact number of UEs or may indicate a specific parameter value related to the number of UEs. At this time, according to the value of the number of UEs indicated by DCI or a parameter value related thereto, the UE changes the PUCCH start symbol among the fixed number of symbols. For example, when the indicated value is large, the PUCCH start symbol can be pushed back, and when the indicated value is small, the PUCCH start symbol can be brought forward. That is, the entire PUCCH resource can be changed according to the number of UEs.

In this method, since the number of symbols is fixed, if the value indicated by DCI is greater than a certain number, it is no longer possible to push the PUCCH start symbol backward. Accordingly, when the number of UEs is equal to or greater than a certain number, the base station may perform PTP transmission to a specific UE using DCI dedicated to the UE. Alternatively, when the DCI-indicated value is greater than or equal to a certain number according to the UE-specific configuration designated by RRC, some UEs may transmit NACK-only based HARQ-ACK with the UE common PUCCH resource.

Method 3-1C: different startingSymbolIndex with different nrofSymbols for different UEs by DCI No of UEs in DCI changes startingSymbolIndex and nrofSymbols DCI for scheduling PTM/PTP PDSCH for a specific G-RNTI indicates the number of UEs in a cell that receive transmission for that G-RNTI. DCI may indicate the exact number of UEs or may indicate a specific parameter value related to the number of UEs. At this time, according to the value of the number of UEs indicated by DCI or a parameter value related thereto, the UE changes the number of symbols of the PUCCH resource and the PUCCH start symbol together. For example, if the indicated value is large, the number of symbols may be increased and the PUCCH start symbol may be pushed back. On the other hand, when the indicated value is small, the number of symbols may be reduced and the PUCCH start symbol may be brought forward. That is, the PUCCH start symbol and number of symbols of a specific UE are changed according to the number of UEs indicated by DCI, so that the size of the entire PUCCH resource can be changed in time.

Method 3-2: A method of distributing PUCCH resources according to the number of UEs based on PRB Method 3-2A: different startingPRB with same noofPRB for different UEs by RRC The base station sets different starting PRB startingPRB s of PUCCH resources for different UEs with a UE-specific RRC message. In this case, the total number of PRBs of the PUCCH resource noofPRB is set to the same value for all UEs in the group.

Method 3-2B: different startingPRB with same noofPRB for different UEs by DCI

DCI for scheduling PTM/PTP PDSCH for a specific G-RNTI indicates the number of UEs in a cell that receive transmission for that G-RNTI. DCI may indicate the exact number of UEs or may indicate a specific parameter value related to the number of UEs. At this time, according to the value of the number of UEs indicated by the DCI or a parameter value related thereto, the UE changes the PUCCH start PRB position among the fixed number of PRBs.

In this method, since the number of PRBs is fixed, when the value indicated by the DCI is a certain number or more, different PUCCH start PRBs can no longer be allocated for each UE. Accordingly, when the number of UEs is equal to or greater than a certain number, the base station may perform PTP transmission to a specific UE using DCI dedicated to the UE. Alternatively, when the DCI-indicated value is greater than or equal to a certain number according to the UE-specific configuration designated by RRC, some UEs may transmit NACK-only based HARQ-ACK with the UE common PUCCH resource.

Method 3-2C: different startingPRB with different noofPRB for different UEs by DCI No of UEs in DCI changes startingPRB and noofPRB.

DCI for scheduling PTM/PTP PDSCH for a specific G-RNTI indicates the number of UEs in a cell that receive transmission for that G-RNTI. DCI may indicate the exact number of UEs or may indicate a specific parameter value related to the number of UEs. At this time, according to the value of the number of UEs indicated by DCI or a parameter value related thereto, the UE changes the number of PRB s of the PUCCH resource and the PUCCH start PRB together.

Method 3-3: A method of distributing PUCCH resources according to the number of UEs based on sequence For the same or different PUCCH resources, different UEs transmit PUCCHs based on different sequences. For example, different UEs use different OCCs to transmit PUCCH.

DCI scheduling PTM/PTP PDSCH for a specific G-RNTI may indicate the number of UEs in a cell that receive transmission for the G-RNTI. In this case, different sequences may be allocated according to the number of UEs.

Method 4: A method for mapping DCI's PRI with one or a plurality of TCI states for PUCCH transmission Mapping between PRIs (or PUCCH resource IDs) and SSB/TCI states can be configured by RRC or MAC CE. If group common DCI indicates one or more PRIs, UE selects one of the TCI state(s) associated to the indicated PRI(s) and transmits HARQ-ACK on the PUCCH resource indicated by the PRI associated with the selected TCI.

Method 4-1: The TCI state of the CORESET where a DCI is received is associated with one or more PRI indicated by the DCI.

UE transmits HARQ-ACK on the PUCCH resource indicated by one of the PRIs with the TCI state Method 4-2: Multiple TCI states are associated with one PRI indicated by a DCI.

PRI indicated by DCI is mapped to a plurality of TCI states. The UE transmits HARQ-ACK to the PRI when there is a TCI state above the threshold. If there is no TCI state above the threshold, HARQ-ACK is not transmitted.

Method 4-3: Different TCI states are associated with different PRIs indicated by a DCI The UE selects a TCI state selected by beam management or a best TCI state or a TCI state higher than or equal to a threshold, and transmits the HARQ-ACK using the PRI mapped thereto.

Method 4-4: Different TCI states are associated with different (sub-)slots of PUCCH resources When PUCCH resources are configured in a plurality of (sub-)slots for the UE group PDSCH, different (sub-)slots are mapped to different TCI states. The UE selects the best TCI state or a TCI state higher than or equal to the threshold, and transmits the HARQ-ACK using the (sub-)slot PUCCH resource mapped thereto.

Method 5: A method of transmitting MBS HARQ-ACK using DCI dedicated to UE scheduling unicast PDSCH If there is a PUCCH resource indicated by PRI and K1 of a UE-specific DCI in which CRC is scrambled with the C-RNTI of the UE, the UE uses MBS as the PUCCH resource indicated by PRI and K1 of the UE-specific DCI in PUCCH-config for unicast of RRC. HARQ-ACK may be transmitted. That is, when the first HARQ-ACK transmission for the group common PDSCH can be muxed with the second HARQ-ACK of the PDSCH scheduled by UE-specific DCI, the UE receives the sub-codebook for the first HARQ-ACK and the second HARQ-ACK for the The sub-codebook is concatenated to configure the HARQ-ACK codebook, and it is transmitted through the PUCCH resource indicated by the PRI and K1 of the UE-specific DCI.

If the first HARQ-ACK cannot be transmitted through the PUCCH resource because UE capability (e.g. processing time) is not satisfied, the UE drops the first HARQ-ACK and transmits only the second HARQ-ACK through the PUCCH resource.

When ACK/NACK-based HARQ-ACK is configured and PUCCH-config for multicast is not configured, the UE determines a PUCCH resource for MBS HARQ-ACK transmission by using one or more of the following methods.

Method 6: A method of allocating PUCCH resources of PUCCH-config for unicast corresponding to PRI and K1 of DCI Option 6-1: If only PUCCH-config for unicast is configured, PRI of group common DCI is ignored and MBS HARQ-ACK is not transmitted.

If UE-specific DCI PRI for PTP PDSCH transmission is received, PUCCH-config for unicast is applied to transmit HARQ-ACK for PTP PDSCH.

Alternatively, even if UE-specific DCI PRI for PTP PDSCH transmission is received, since HARQ-ACK for multicast is HARQ-ACK, the PRI is ignored and HARQ-ACK for PTP PDSCH is not transmitted Option 6-2: The UE maps the PRI of DCI to the candidate pucch-ResourceId value of PUCCH-config for unicast and transmits MBS HARQ-ACK.

In this case, as in Method 1, the MBS HARQ-ACK is transmitted using the PUCCH resource mapped to the candidate pucch-ResourceId value of the PUCCH-config indicated by the PRI of the DCI. For example, when Group common DCI indicates UE specific PRI as in Option 1A-1, MBS HARQ-ACK may be transmitted by applying PUCCH resource corresponding to the PRI indicated in PUCCH-config for unicast.

Method 7: Method of allocating PUCCH resources of PUCCH-config for unicast corresponding to PRI and K1 of DCI when a plurality of PUCCHs are simultaneously transmitted Method 7-1: When the UE receives the Group common DCI, and the DCI includes PRI and K1 for MBS, the UE MBS HARQ-ACK as a PUCCH resource of PUCCH-config for unicast indicated by the included PRI and K1 for MBS send.

Method 7-2: When the UE receives UE-specific DCI including PRI/K1 for Rel-15/16 and PRI/K1 for MBS at the same time, the UE receives PUCCH-config for unicast indicated by the included PRI and K1 for MBS MBS HARQ-ACK is transmitted as PUCCH resource of Meanwhile, PRI/K1 for Rel-15/16 transmits HARQ-ACK for unicast PDSCH according to the prior art.

For details of PUCCH transmission according to PRI and K1, refer to Method 1.

Method 8: Method of allocating PUCCH resources of PUCCH-config for unicast corresponding to PRI and K1 of DCI when a plurality of PUCCHs are not transmitted simultaneously Method 8-1: If the Group common DCI received by the UE includes a PRI for MBS, ignore the included PRI for MBS and do not transmit MBS HARQ-ACK Method 8-2: If the Group common DCI received by the UE includes UE-specific MBS PRI/K1, MBS HARQ-ACK is transmitted as the PUCCH resource of the PUCCH-config for unicast indicated by the included UE-specific PRI and K1.

If the Group common DCI received by the UE includes UE-specific MBS PRI/K1, MBS HARQ-ACK is transmitted as a PUCCH resource of PUCCH-config for unicast indicated by the included UE-specific PRI and K1.

At this time, if there is UCI for unicast (e.g. unicast HARQ-ACK or SR or CSI), UCI for unicast and MBS HARQ-ACK are muxed(multiplexing) and transmitted.

In this case, only HARQ-ACK for PTP retransmission may be transmitted by muxing with unicast UCI in a limited manner.

Method 8-3: If the UE-specific DCI received by the UE includes only PRI/K1 of Rel-15/16, the UE receives MBS HARQ-ACK on the PUCCH resource of the PUCCH-config for unicast indicated by the included PRI and K1.

At this time, if there is UCI for unicast (e.g. unicast HARQ-ACK or SR or CSI), UCI for unicast and MBS HARQ-ACK are multiplexed and transmitted.

In this case, only HARQ-ACK for PTP retransmission may be transmitted by multiplexing with unicast UCI in a limited manner.

For details of PUCCH transmission according to PRI and K1, refer to Method 1.

In the above methods, when Unicast UCI and MBS HARQ-ACK are separately transmitted or one cannot be dropped and both must be transmitted together by Mux (for example, when unicsat and multicast have the same priority), the UE uses the unicast sub-codebook and MBS After constructing a sub-codebook for use, the HARQ-ACK codebook can be configured by concatenation. Alternatively, the UE may configure feedback for unicast and MBS as a joint codebook.

The UE transmits the HARQ NACK to the base station using one or more of the above methods.

11. The high or low priority of HARQ-ACK feedback can be indicated by group common DCI for PTM transmission or UE specific DCI for PTP transmission. If PUCCH carrying MBS HARQ-ACK cannot be transmitted with other UL transmission, UE applies the following rules to determine whether to send MBS HARQ-ACK.

A. The high priority of MBS HARQ-ACK feedback has a lower priority than the high priority of unicast HARQ-ACK feedback.

B. Any high priority of HARQ-ACK feedback has a higher priority of any low priority of HARQ-ACK feedback, regardless of multicast and unicast.

C. The low priority of MBS HARQ-ACK feedback and the low priority of unicast HARQ-ACK feedback have an equal priority.

D. HARQ-ACK feedback has a higher priority than unicast periodic CSI reporting

When other UL transmission or DL reception overlaps with MBS HARQ-ACK transmission, the UE drops the corresponding MBS HARQ-ACK when the priority of MBS HARQ-ACK is lower than that of other transmission/reception. At this time, if the corresponding HARQ-ACK is ACK, it is not dropped, and the ACK is transmitted again using PUCCH resources available within a predetermined time. However, in case of NACK, it is dropped. For example, if the group common PDSCH is transmitted up to 8 times, and when a specific UE is ACK in transmission 4, if ACK transmission 4 is dropped, the ACK may be retransmitted using the ACK transmission resource 5 or 6 times.

Meanwhile, for MBS HARQ-ACK, ACK and NACK may be configured to have different priorities. For example, when other UL transmission or DL reception overlaps with MBS HARQ-ACK transmission, the UE may make the case of MBS HARQ-ACK ACK have higher priority than the case of NACK. That is, ACK can be set to high priority and NACK can be set to low priority. Alternatively, in the case of ACK, set the priority designated by RRC or DCI, and in the case of NACK, set it to the low priority designated by RRC, or set to a lower priority than the priority designated by DCI (e.g. HP→LP).

12. Upon receiving the HARQ NACK with a TCI state, gNB may retransmit PDCCH and PDSCH with the TCI state in the configured DL CFR for retransmission of the TB. UE monitors group common and/or UE specific PDCCH with the TCI state on the configured search space in the DL CFR to receive a retransmission of the TB.

gNB can retransmit the TB to only one of the UEs in the group by UE specific PDCCH while other UEs do not receive the retransmission of the TB e.g. because they have successfully received the TB.

13. If UE receives the PDCCH for the retransmission of the TB, UE receives PDSCH scheduled by the DCI of the PDCCH.

If UE successfully decodes the TB on the PDSCH, UE considers that the decoded TB is associated to MTCH, MRB, TMGI, G-RNTI and/or short ID of the MBS service, based on mapping between MBS services and HPNs (HARQ Process Numbers) indicated by the DCI, and/or mapping between MBS services and, if available, short ID(s) indicated by the DCI.

14. If decoding the TB on the PDSCH transmission occasion is successful, UE sends HARQ ACK to gNB on a PUCCH resource in the configured UL CFR, for example, according to PUCCH configuration received by the RRC message, and PUCCH resource indicator and PDSCH-to-HARQ_feedback timing indicator received by the retransmission DCI.

In this case, the UE transmits the HARQ ACK to the base station using one or more of the methods of step 10.

15. gNB may activate and/or deactivate one or more TCI states for G-RNTI or the CFR or the UE by sending TCI State Indication for Group Common MAC CE or for UE specific MAC CE. Upon receiving the MAC CE, UE activates and/or deactivate the TCI state(s) indicated by the MAC CE for reception of group common PDCCH and/or group common PDSCH for the G-RNTI or the CFR indicated by the MAC CE.

16. If gNB changes mapping between MBS services and HPNs (HARQ Process Numbers), and/or mapping between MBS services and, if available, short ID(s), gNB can inform UE about changed mapping by sending a RRC message or a group common MAC CE (for change of group common mapping) or a UE specific MAC CE (for change of UE specific mapping).

Figure 22:
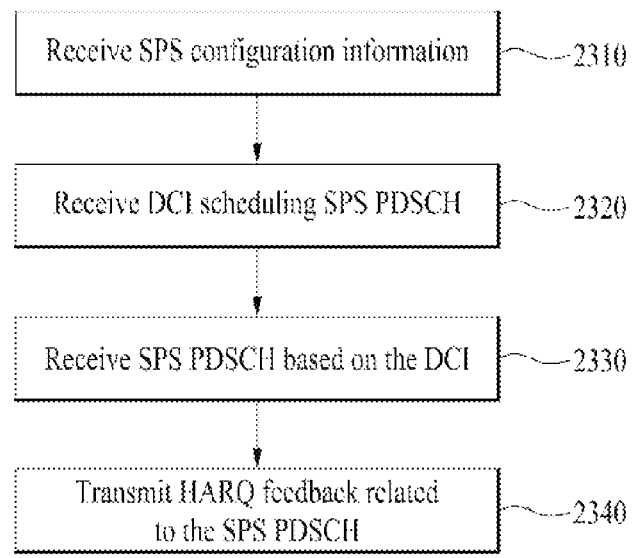
FIG. 22 illustrates a flowchart of UE performing according to the present disclosure.

FIG. 22 illustrates a flowchart of UE performing according to the present disclosure.

UE receives information on a physical uplink control channel (PUCCH) configuration for the UE specific (2210).

UE receives a downlink control information (DCI) scheduling a physical downlink shared channel (PDSCH) for multicast (2220). The DCI includes a first field related with PUCCH resource indicator (PRI) and a second field related to a PDSCH-to-HARQ feedback timing indicator.

UE receives the PDSCH for multicast based on the DCI (2230).

UE determes a PUCCH resource for transmission of a PUCCH in a slot based on the PRI and transmits the PUCCH including information on a hybrid automatic repeat request (HARQ) feedback related to the PDSCH for multicast based on the DCI (2240). The PDSCH-to-HARQ feedback timing indicator is determined based on the PUCCH configuration for the UE specific. The slot is determined based on the PDSCH-to-HARQ feedback timing indicator The DCI is commonly used for a group comprising a plurality UEs including the UE.

A CRC of the DCI is scrambled with a RNTI for the group.

The PUCCH resource is separately configured for each UE in the group sharing the PRI and the PDSCH-to-HARQ feedback timing indicator.

The PRI of the DCI indicates enabling or disabling of the HARQ feedback.

Based on transmission timing of the HARQ feedback overlaps with another uplink transmission or downlink reception, the HARQ feedback is dropped based on a priority of the HARQ feedback is lower than another uplink transmission or downlink reception.

The PCI of the DCI is mapped to one or a plurality of transmission configuration indicator (TCI) states for the PUCCH.

Effect of the Disclosure

The present disclosure proposes a UE-only PUCCH resource allocation scheme according to the UE-specific RRC configuration and the group common DCI indication. Accordingly, HARQ-ACK transmission of individual UEs in the group for group common PDSCH transmission is possible.

Figure 23:
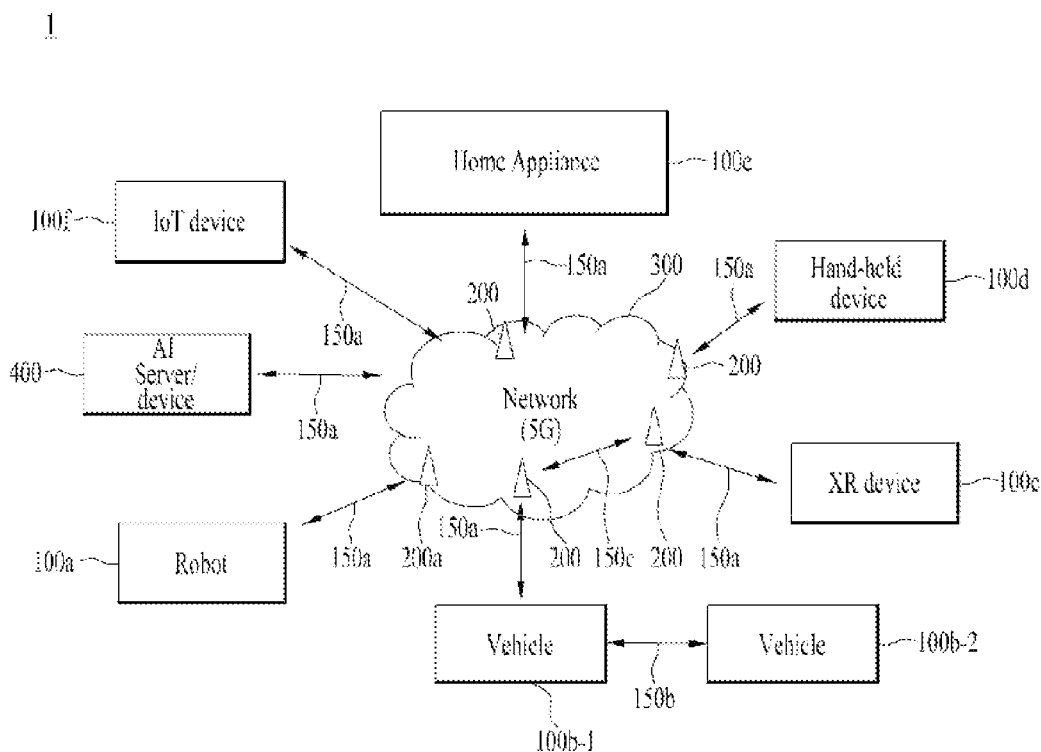
FIG. 23 to FIG. 26 illustrate a communication system 1 and wireless devices applied to the present disclosure.

FIG. 23 illustrates a communication system 1 applied to the present disclosure.

Referring to FIG. 23, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
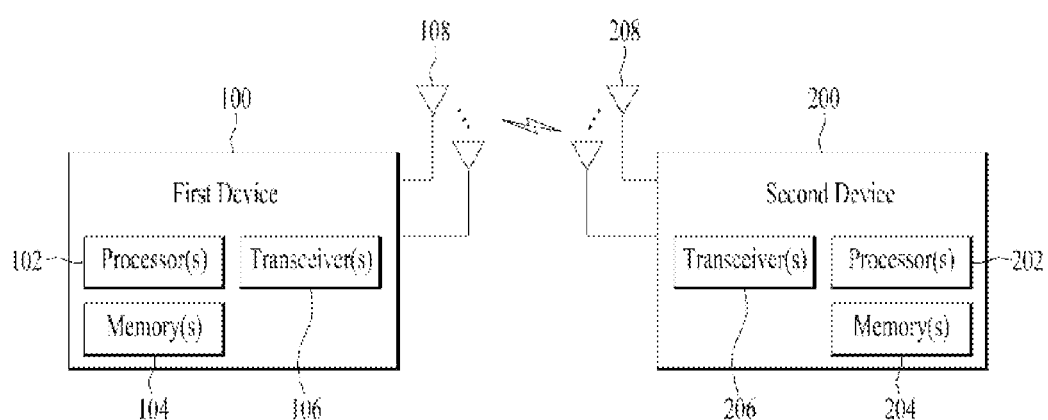

FIG. 24 illustrates wireless devices applicable to the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
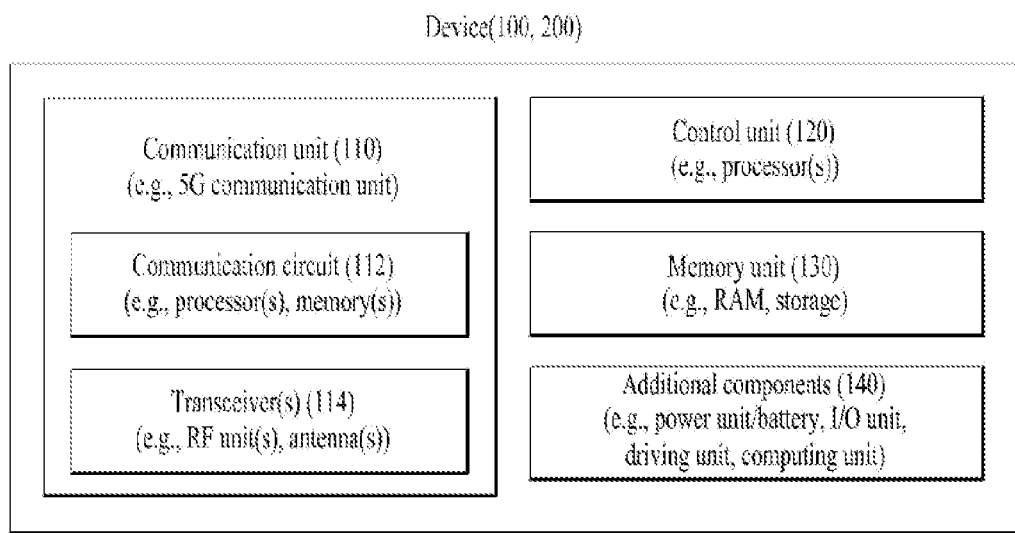

FIG. 25 illustrates another example of a wireless device applied to the present disclosure. The wireless device may be implemented in various forms according to a use-case/service (refer to FIG. 25).

Referring to FIG. 25, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 23), the vehicles (100*b*-1 and 100*b*-2 of FIG. 23), the XR device (100*c* of FIG. 23), the hand-held device (100*d* of FIG. 23), the home appliance (100*e* of FIG. 23), the IoT device (100*f* of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 26:
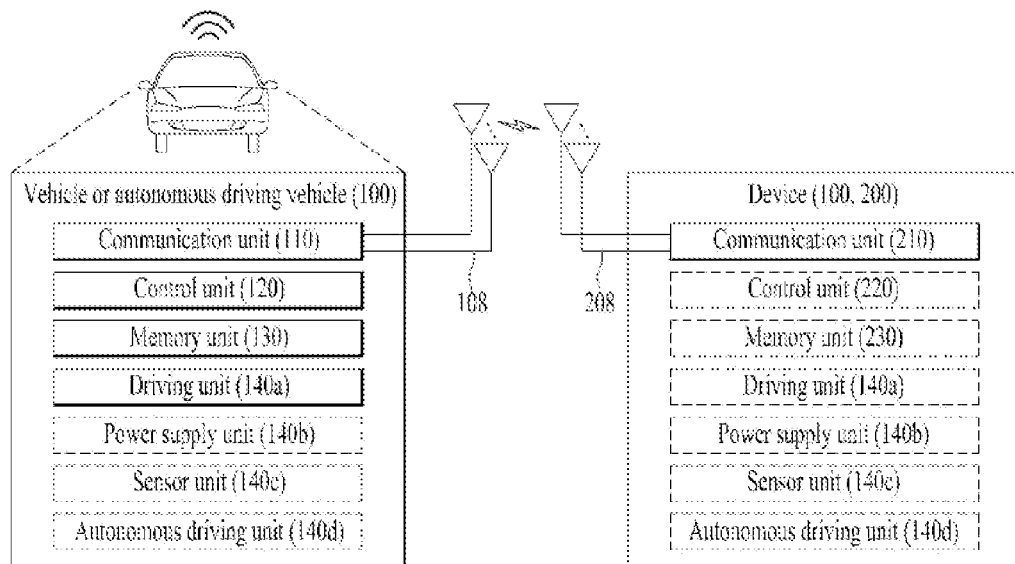

FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 27:
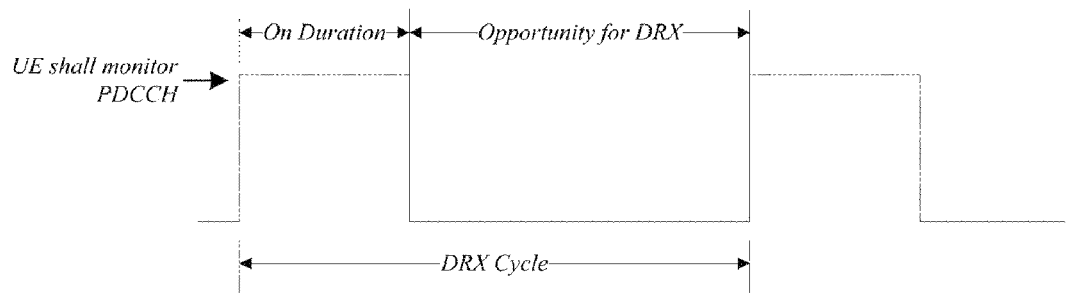
FIG. 27 illustrates an exemplary discontinuous reception (DRX) operation applied to the present disclosure.

FIG. 27 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 27, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the p UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 11 describes a DRX operation of a UE (in the RRC_CONNECTED state). Referring to Table 11, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 23.

TABLE 11

|  | Type of signals | UE procedure |
| --- | --- | --- |
| 1$^{st}$ step | RRC signalling(MAC-CellGroupConfig) | - Receive DRX configuration information |
| 2$^{nd}$ Step | MAC CE((Long) DRX command MAC CE) | - Receive DRX command |
| 3$^{rd}$ Step | — | - Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.
Value of drx-InactivityTimer: defines the duration of a time period during which the UE is awake after a PDCCH occasion in which a PDCCH indicating initial UL or DL data has been detected
Value of drx-HARQ-RTT-TimerDL: defines the duration of a maximum time period until a DL retransmission is received after reception of a DL initial transmission.
Value of drx-HARQ-RTT-TimerDL: defines the duration of a maximum time period until a grant for a UL retransmission is received after reception of a grant for a UL initial transmission.
drx-LongCycleStartOffset: defines the duration and starting time of a DRX cycle.
drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of transmitting and receiving signals by a user equipment (UE) in a wireless communication system, the method comprising:
receiving UE-specific Radio Resource Control (RRC) configuration information on a physical uplink control channel (PUCCH) configuration; and
receiving a downlink control information (DCI) scheduling a physical downlink shared channel (PDSCH),
wherein the DCI includes a first field related with PUCCH resource indicator (PRI) and a second field related to a PDSCH-to-hybrid automatic repeat request (HARQ) feedback timing indicator,
wherein the UE-specific RRC configuration information separately configures first timing information of the DCI for unicast and second timing information of the DCI for multicast, and
wherein the first timing information and the second timing information provide timings related to the PDSCH-to-HARQ feedback timing indicator.

2. The method according to claim 1, further comprises:
determining a PUCCH resource for transmission of the PUCCH in a slot based on the PRI,
receiving the PDSCH based on the DCI; and
transmitting a PUCCH including information on a HARQ feedback related to the PDSCH based on the DCI.

3. The method according to claim 1, wherein, based on the DCI scheduling the PDSCH for multicast, the DCI is commonly used for a group comprising a plurality of UEs including the UE, and
wherein a CRC of the DCI is scrambled with a RNTI for the group.

4. The method according to claim 3, wherein, a timing determined based on the PDSCH-to-HARQ feedback timing indicator is different among a plurality of UEs included in the group by the second timing information.

5. The method according to claim 1, wherein the PRI of the DCI is mapped to one or a plurality of transmission configuration indicator (TCI) states for the PUCCH.

6. A user equipment (UE) configured to operate in a wireless communication system, the UE comprising:
at least one transceiver; and
at least one processor connected to the at least one transceiver,
wherein the at least one processor is configured to control the at least one transceiver to:
receive UE-specific Radio Resource Control (RRC) configuration information on a physical uplink control channel (PUCCH) configuration; and
receive a downlink control information (DCI) scheduling a physical downlink shared channel (PDSCH),
wherein the DCI includes a first field related with PUCCH resource indicator (PRI) and a second field related to a PDSCH-to-hybrid automatic repeat request (HARQ) feedback timing indicator, and
wherein UE-specific RRC configuration information separately configures first timing information of the DCI for unicast and second timing information of the DCI for multicast, and
wherein the first timing information and the second timing information provide timings related to the PDSCH-to-HARQ feedback timing indicator.

7. A method of transmitting and receiving signals by a base station in a wireless communication system, the method comprising:
transmitting UE-specific Radio Resource Control (RRC) configuration information on a physical uplink control channel (PUCCH) configuration; and
transmitting a downlink control information (DCI) scheduling a physical downlink shared channel (PDSCH),
wherein the DCI includes a first field related with PUCCH resource indicator (PRI) and a second field related to a PDSCH-to-hybrid automatic repeat request (HARQ) feedback timing indicator,
wherein the UE-specific RRC configuration information separately configures first timing information of the DCI for unicast and second timing information of the DCI for multicast, and wherein the first timing information and the second timing information provide timings related to the PDSCH-to-HARQ feedback timing indicator.

8. The method according to claim 7, wherein the DCI, which is configured for multicast, includes information on activation or release for a Semi Persistent Scheduling (SPS) PDSCH.

9. The method according to claim 7, wherein, based on the DCI scheduling the PDSCH for multicast, the DCI is commonly used for a group comprising a plurality UEs including the UE, and
wherein a CRC of the DCI is scrambled with a RNTI for the group.

10. The method according to claim 9, wherein a timing determined based on the PDSCH-to-HARQ feedback timing indicator is different among a plurality of UEs included in the group by the second timing information.

11. The method according to claim 7, wherein the PRI of the DCI is mapped to one or a plurality of transmission configuration indicator (TCI) states for the PUCCH.

12. A base station configured to operate in a wireless communication system, the base station comprising:
at least one transceiver; and
at least one processor connected to the at least one transceiver,
wherein the at least one processor is configured to control the at least one transceiver to:
transmit user equipment (UE)-specific Radio Resource Control (RRC) configuration information on a physical uplink control channel (PUCCH) configuration; and
transmit a downlink control information (DCI) scheduling a physical downlink shared channel (PDSCH),
wherein the DCI includes a first field related with PUCCH resource indicator (PRI) and a second field related to a PDSCH-to-hybrid automatic repeat request (HARQ) feedback timing indicator,
wherein the UE-specific RRC configuration information separately configures first timing information of the DCI for unicast and second timing information of the DCI for multicast, and
wherein the first timing information and the second timing information provide timings related to the PDSCH-to-HARQ feedback timing indicator.

13. At least one computer-readable memory operably connected to at least one processor and storing instructions that, based on being executed by the at least one processor, control a user equipment operating in a wireless communication system to perform operations comprising:
receiving user equipment (UE)-specific Radio Resource Control (RRC) configuration information on a physical uplink control channel (PUCCH) configuration; and
receiving a downlink control information (DCI) scheduling a physical downlink shared channel (PDSCH),
wherein the DCI includes a first field related with PUCCH resource indicator (PRI) and a second field related to a PDSCH-to-hybrid automatic repeat request (HARQ) feedback timing indicator,
wherein the UE-specific RRC configuration information separately configures first timing information of the DCI for unicast and second timing information of the DCI for multicast, and
wherein the first timing information and the second timing information provide timings related to the PDSCH-to-HARQ feedback timing indicator.

* * * * *